(12) United States Patent
Sato

(10) Patent No.: US 7,301,552 B2
(45) Date of Patent: Nov. 27, 2007

(54) IMAGE FORMING APPARATUS WITH PRINTING DATA CORRECTION ARRANGEMENT

(75) Inventor: Toshiki Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 669 days.

(21) Appl. No.: 10/223,441

(22) Filed: Aug. 20, 2002

(65) Prior Publication Data

US 2003/0048350 A1  Mar. 13, 2003

(30) Foreign Application Priority Data

Sep. 10, 2001  (JP)  ............................. 2001-273301

(51) Int. Cl.
*B41J 2/435* (2006.01)

(52) U.S. Cl. ...................... 347/237; 347/247

(58) Field of Classification Search ........ 347/236–238, 347/239, 240, 246–247, 251–254, 19, 129–133, 347/145; 358/1.2, 1.9, 3.02; 382/262, 170, 382/270–275; 359/210
See application file for complete search history.

(56) References Cited

U.S. PATENT DOCUMENTS

| | | | |
|---|---|---|---|
| 4,827,533 A * | 5/1989 | Tanaka ........................ 382/262 |
| 5,467,422 A * | 11/1995 | Itihara et al. ............... 358/3.02 |
| 5,596,444 A * | 1/1997 | Eguchi ........................ 359/210 |
| 5,729,626 A * | 3/1998 | Hada et al. .................. 382/170 |
| 6,134,025 A * | 10/2000 | Takeuchi et al. ............. 358/1.2 |
| 6,137,518 A * | 10/2000 | Maeda ........................ 347/131 |
| 6,169,566 B1 * | 1/2001 | Katakura ..................... 347/240 |
| 6,247,780 B1 * | 6/2001 | Matsubara et al. ........... 347/19 |
| 6,266,077 B1 * | 7/2001 | Kamimura ................... 347/236 |
| 6,438,270 B1 * | 8/2002 | Harrington .................. 382/262 |
| 6,603,496 B2 * | 8/2003 | Nagumo et al. ............. 347/131 |
| 6,717,696 B1 * | 4/2004 | Wang et al. .................. 358/1.9 |

* cited by examiner

*Primary Examiner*—Hai Pham
(74) *Attorney, Agent, or Firm*—Rabin & Berdo, P.C.

(57) ABSTRACT

An image forming apparatus with a plurality of driven elements has a memory for storing driving data on each of the driven elements for driving the driven elements, and a computing unit that reads, from the memory, driving data on a driven element corresponding to a dot of interest and driving data on at least one driven element corresponding to at least one dot included in an area of predetermined dimensions in which the dot of interest is included, and produces corrected printing data based on the driving data read from the memory and on printing data on the dot of interest input from a higher control unit. The image forming apparatus performs printing by driving the driven element corresponding to the dot of interest by use of the corrected printing data.

5 Claims, 33 Drawing Sheets

FIG.4
(a)
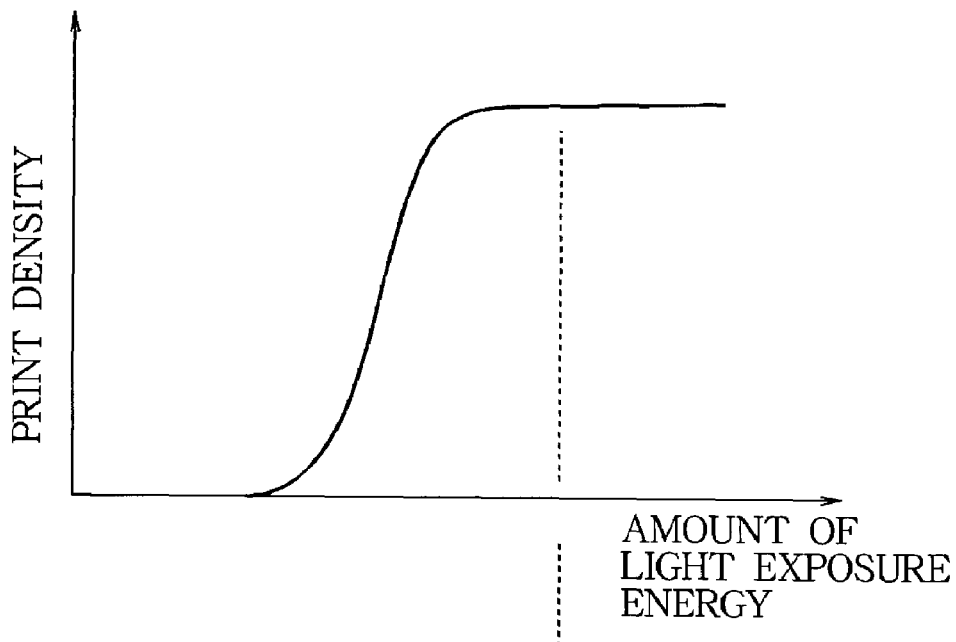
(b)
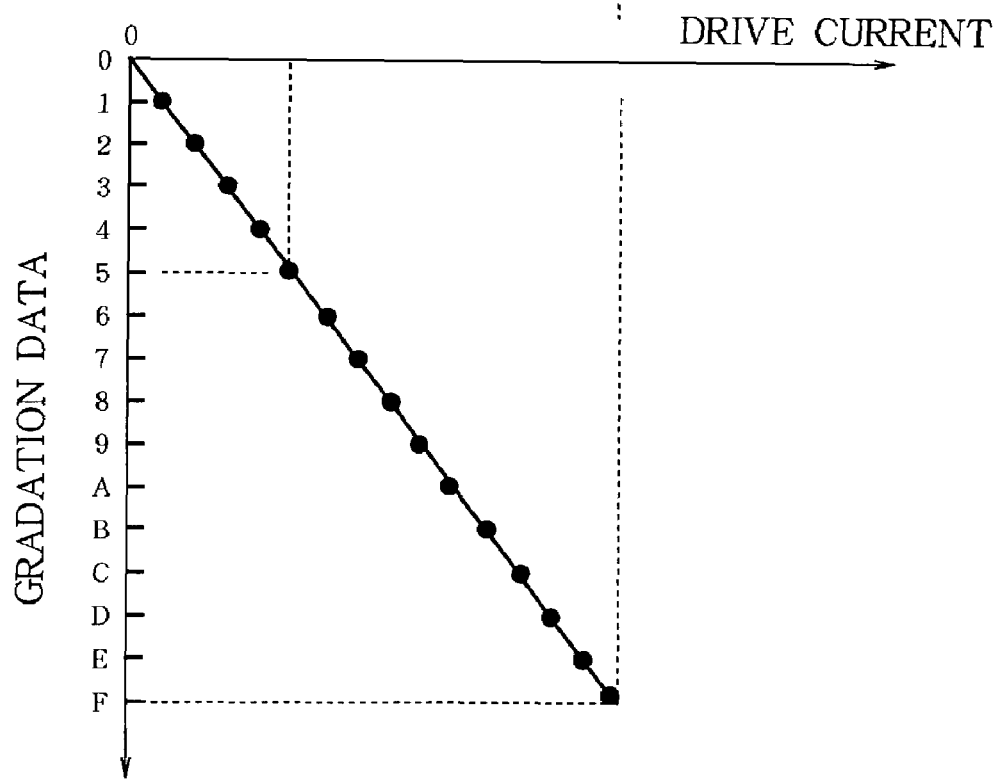

FIG.8
(a)
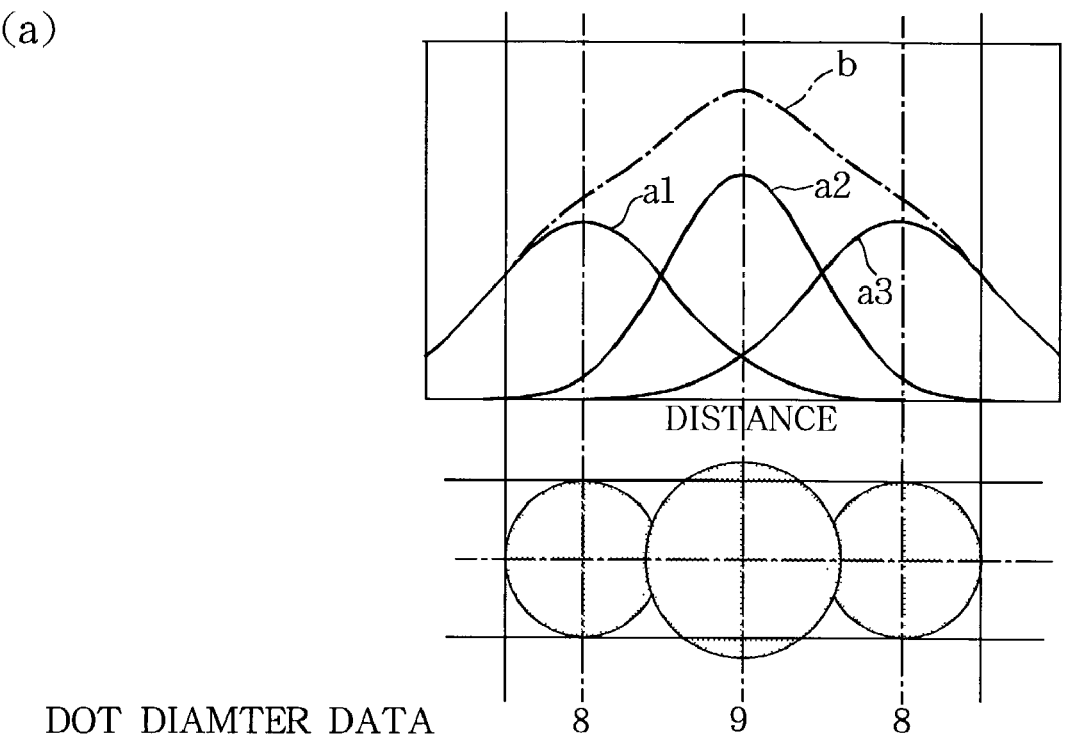
DOT DIAMTER DATA    8    9    8
(b)
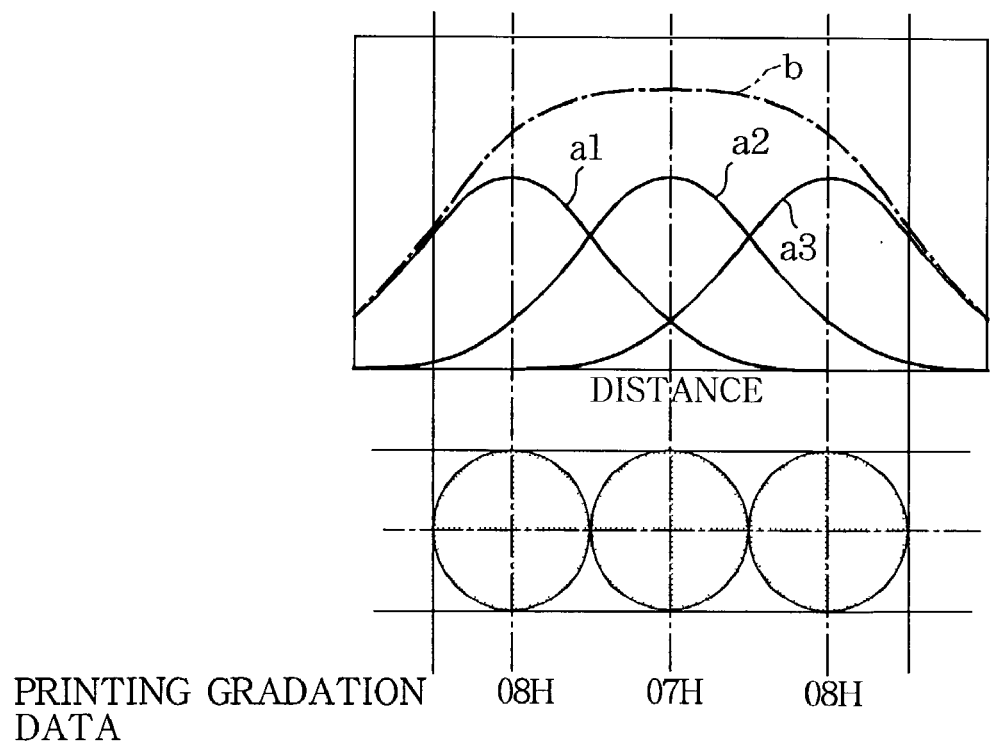
PRINTING GRADATION DATA    08H    07H    08H

DOT DIAMETER DATA    8    8    9    8    9

GRADATION DATA    08H    08H    07H    08H    08H

DISTANCE

DISTANCE

FIG.19
(a)
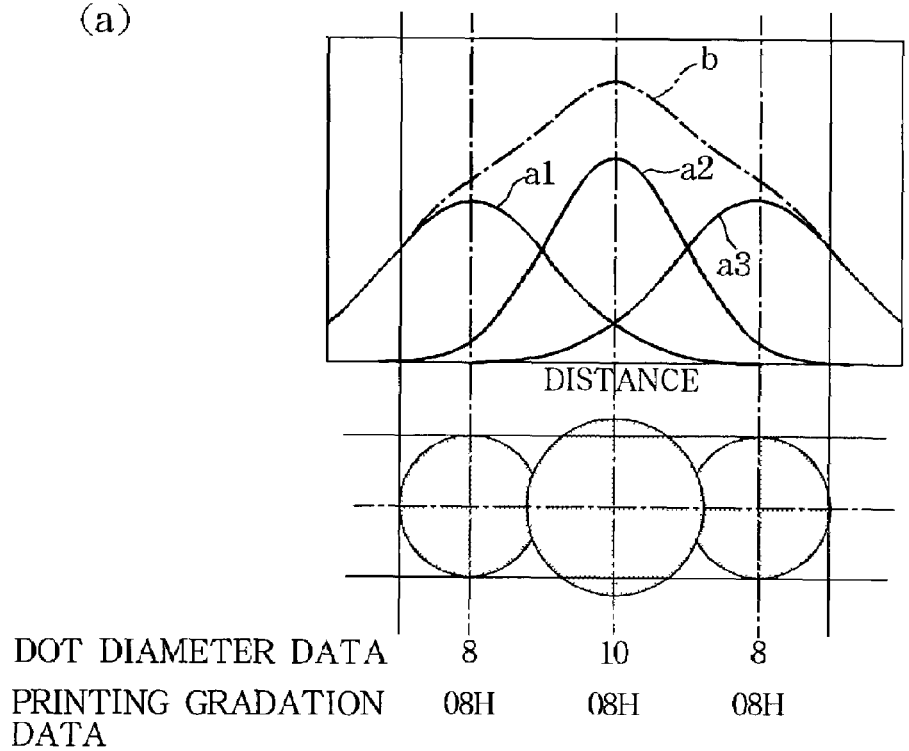
| DOT DIAMETER DATA | 8 | 10 | 8 |
| PRINTING GRADATION DATA | 08H | 08H | 08H |
(b)
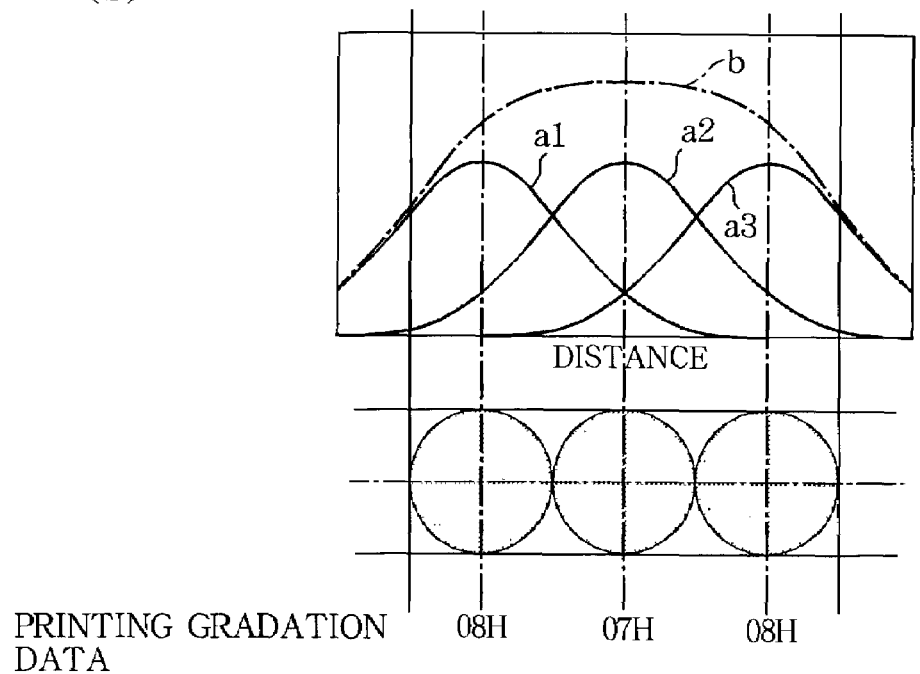
| PRINTING GRADATION DATA | 08H | 07H | 08H |

FIG.24
(a)
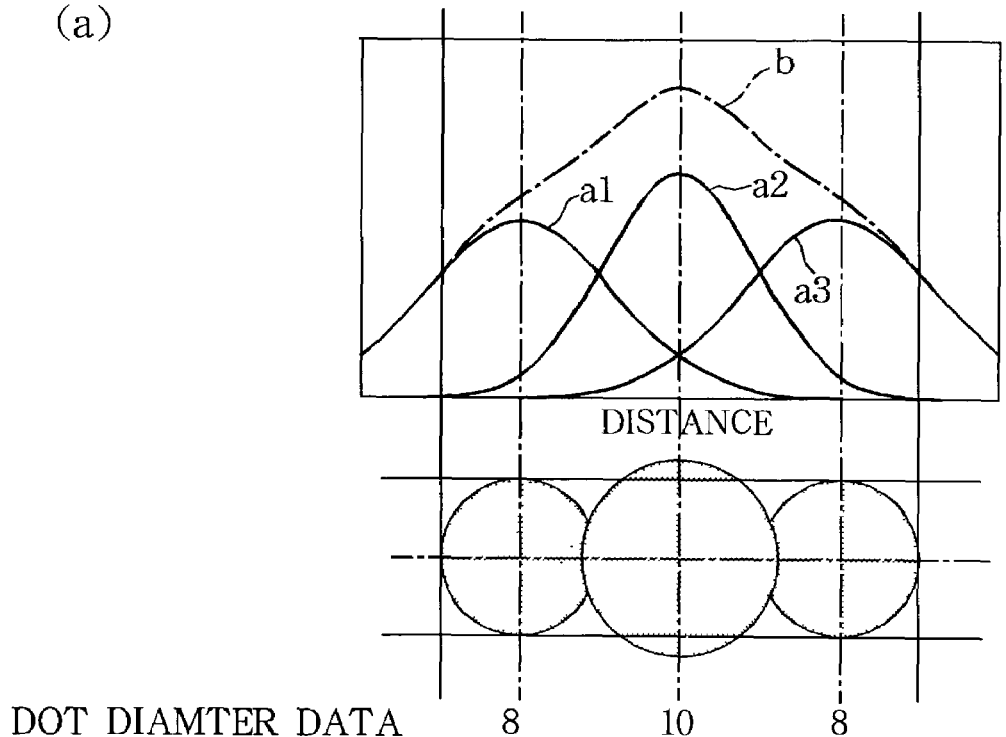
DOT DIAMTER DATA     8     10     8
(b)
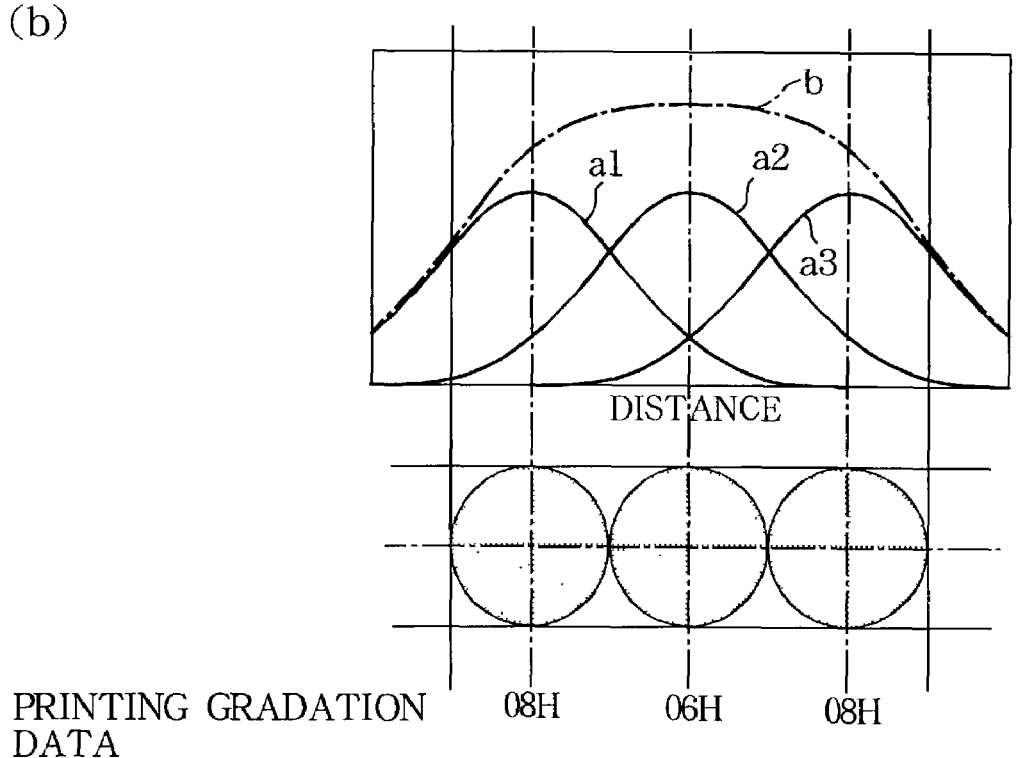
PRINTING GRADATION DATA     08H     06H     08H

FIG.29
(a)
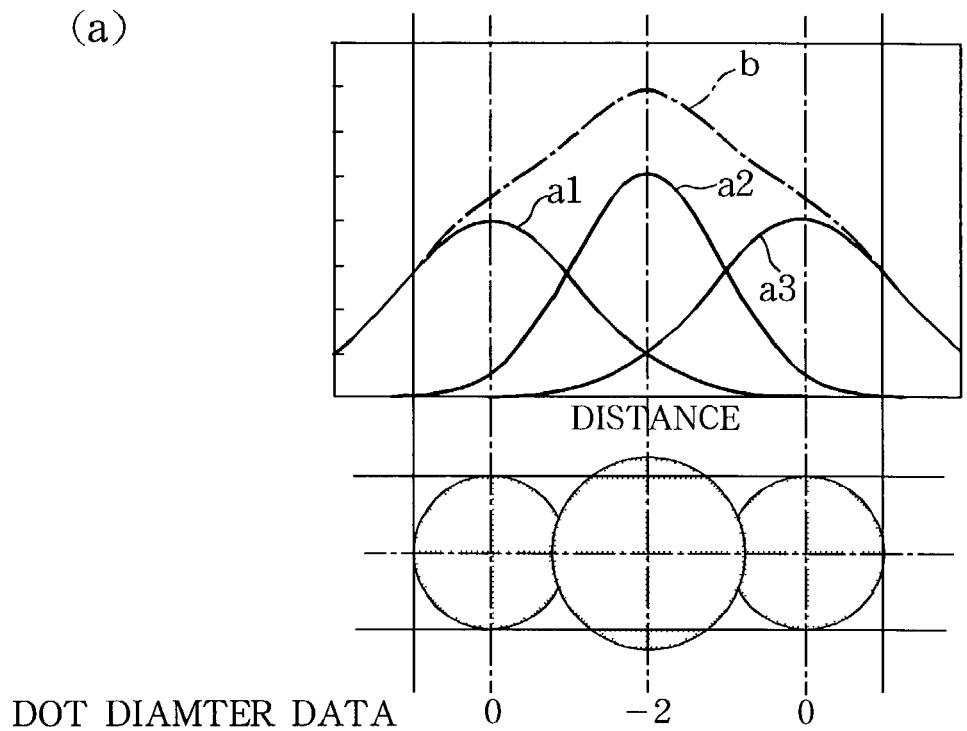
DOT DIAMTER DATA    0    −2    0
(b)
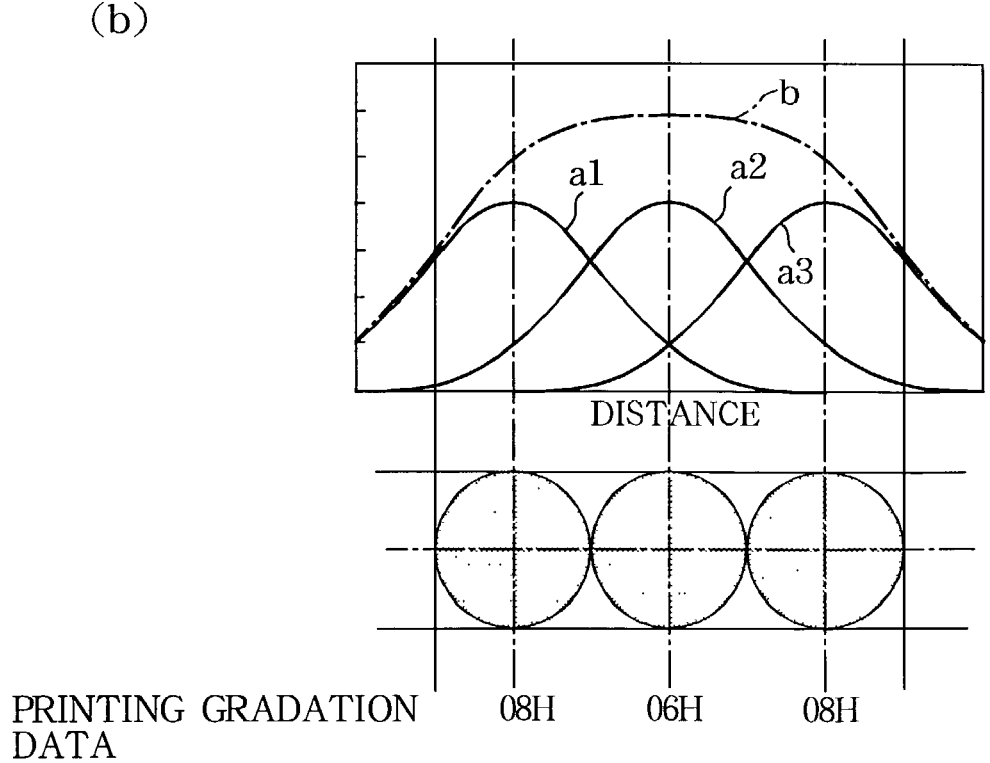
PRINTING GRADATION DATA    08H    06H    08H

FIG.37 (PRIOR ART)
(a)
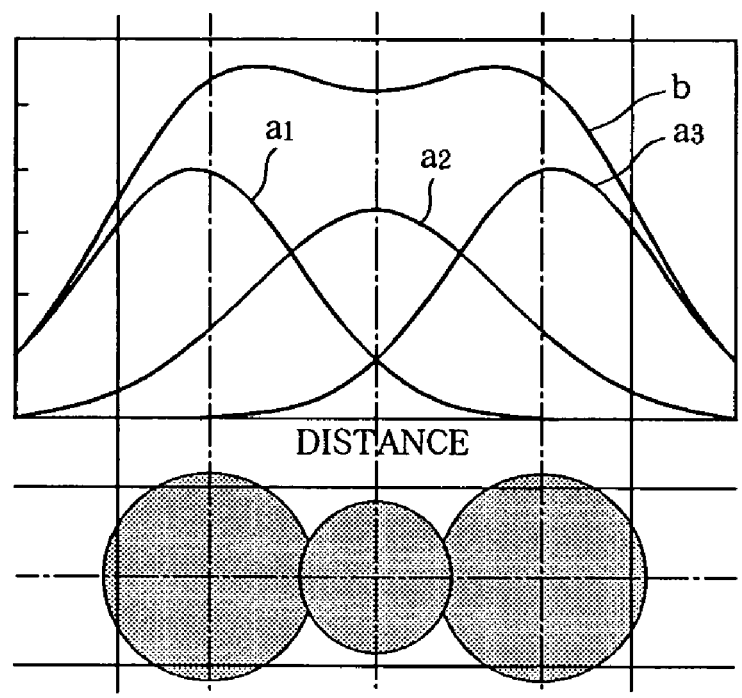
(b)
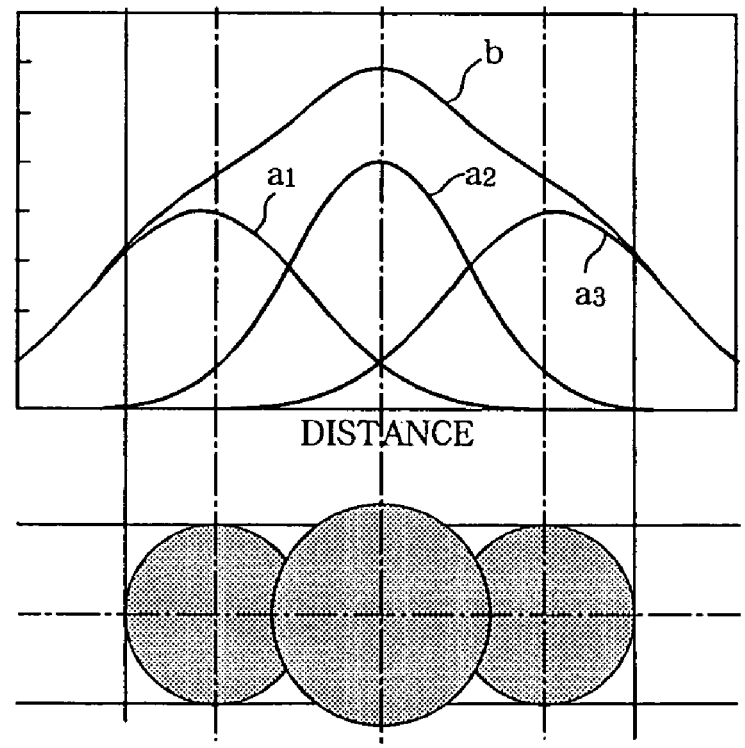

IMAGE FORMING APPARATUS WITH PRINTING DATA CORRECTION ARRANGEMENT

FIELD OF THE INVENTION

This invention relates to an image forming apparatus such as a printer, a copier, and a facsimile machine.

BACKGROUND OF THE INVENTION

A printer of the electrophotographic type, for example, is configured to apply light to a charged photosensitive drum in a selective manner depending on printing data to form an electrostatic latent image. Toner is deposited on the electrostatic latent image to form a toner image and the toner image is transferred to a sheet of paper, where it is fused into place.

FIG. 30 is a block diagram of a printer control circuit for use in such a conventional electrophotographic printer. FIGS. 31 and 32 are timing diagrams explaining the printing operation of the conventional electrophotographic printer. In FIG. 30, a reference numeral 1 denotes a print control unit comprised of a microprocessor, a ROM, a RAM, an input/output port, a timer and so on. The print control unit 1, which is included in a printing unit of the printer, performs sequential control over the whole of the printer in accordance with a control signal SG1 received from a not illustrated higher controller, a video signal SG2 (dot map data arranged in one dimension), etc.

The print control unit 1, upon receiving a command to start printing included in the control signal SG1, determines whether the fixing unit 77 with a built-in heater 77a is within an operable temperature range by use of the temperature sensor 75. If the fixing unit 77 is not within the operable temperature range, the print control unit 1 passes a current through the heater 77a to heat the fixing unit 77 to this range. Then, the print control unit 1 causes the developing/transferring process motor 68 to rotate by use of the driver 67, and at the same time, turns on the charging-high-voltage source 63 to apply the voltage to the charger 64 in response to a charge signal SGC.

The paper remaining sensor 73 and the paper size sensor 74 detect the presence or absence and the size of sheets of paper set in place (not shown). The paper feeding motor 70, which is rotatable in both directions, rotates in the reverse direction first to feed the paper until it is sensed by the paper inlet sensor 71. Then, it rotates in the normal direction to let the paper in a printing mechanism of the printer.

The print control unit 1 sends a timing signal SG3 which includes a main scanning/synchronizing signal and a sub-scanning/synchronizing signal to the higher controller when the paper reaches a particular position, and then receives a video signal SG2 from the higher controller. The video signal SG2 edited page by page in the higher controller and received by the print control unit 1 is transferred to the LED head 78 as printing data HD-DATA. The LED head 78 is comprised of a plurality of LEDs arranged in a line, each LED printing one dot (one pixel).

The print control unit 1, upon receiving one line of video signals, sends a latch signal HD-LOAD to the LED head 78 to have this LED 78 hold the printing data HD-DATA. Thus, the print control unit 1 can carry out printing operation in accordance with the printing data HD-DATA held in the LED head 78 even during reception of the next video signal SG2 output from the higher controller. HD-CLK denotes a clock for sending the printing data HD-DATA to the LED head 78. The sending and receiving of the video signal SG2 is carried out for each line.

The information to be printed by the LED head 78 is formed on the not illustrated photosensitive drum that has been negatively charged as a latent image comprised of dots that are at a raised potential (approximately 0 V). The toner that has been negatively charged is absorbed into each of the dots in a developing unit, and as the result, a toner image is formed. The toner image is sent to the transfer unit 66. At this time, the transfer-voltage source 65 is turned on by a transfer signal SG4, so that the transfer unit 66 transfers the toner image to the paper passing through a gap between the photosensitive drum and the transfer unit 66.

The paper bearing the toner image is conveyed keeping in contact with the fixing unit 77 including the heater 77a, so that the toner image is fused into the paper. The paper bearing this fused image is further conveyed to pass through the printing mechanism and the paper outlet sensor 72, and discharged from the printer. The print control unit 1 applies the voltage generated by the transfer-voltage source 65 to the transfer unit 66 only while the paper is passing through the transfer unit 66 in response to signals output from the paper-size sensor 74 and the paper inlet sensor 71. When the printing operation is completed and the paper passes the paper outlet sensor 72, the application of the voltage generated by the charging-voltage source 63 to the charger 64 is ceased, and at the same time, the developing/transferring process motor 68 is stopped. The above operation is repeated thereafter.

Next, the LED head 78 will be explained. FIG. 33 shows a circuitry of the LED head. As shown in this figure, the printing data HD-DATA is input into the LED head 78 together with the clock HD-CLK. For example, if the printer supports A4 paper and has resolution of 600 dots per inch, 4992 dots of bit data are shifted sequentially through a shift resistor comprised of flip-flops $FF_1, FF_2, \ldots, FF_{4992}$. Then, the latch signal HD-LOAD is input into the LED head 78, so that each dot of bit data is latched in each of the latches $LT_1, LT_2, \ldots, LT_{4992}$. Of the light emitting elements $LD_1, LD_2, \ldots, LD_{4992}$, those assigned to dot data at a high level are lit in accordance with the bit data and a print drive signal HD-STB-N. In this figure, G0 denotes a NOR gate, $G_1, G_2, \ldots, G_{4992}$ denote NAND gates, $TR_1, TR_2, \ldots, TR_{4992}$ denote switching devices, and $V_{DD}$ denotes a power source.

Next, structures of the LED head and a focusing rod lens array are explained with reference FIG. 34. As shown in FIG. 34, the LED head 78 is constituted by LED chips 28 each having light emitting elements, a printed circuit board 27 on which driver IC chips for driving the LED chips 28 are arranged in a line, and a lens array 29 for condensing the lights emitted by the light emitting elements. The lens array, which is used for condensing the lights emitted by the light emitting elements and forming an image on the photosensitive drum, is comprised of a plurality of rod lenses spaced uniformly.

Of the parameters specifying optical characteristics of the lens array, one is the MTF (Modulation Transfer Function). The MTF is explained below with reference to FIG. 35. The MTF, which is one of the techniques for describing an optical system in terms of a frequency characteristic, describes how a spectrum (amplitude) of a spatial frequency at an input differs from that at an output. The MTF can be expressed in equation form shown below as a response function of SLA. The value of the MTF can be calculated on the basis of intensity of the light received by a CCD image sensor when an input image in a grid pattern as shown in FIG. 35 is input into the lens array and an output image is formed on the CCD image sensor disposed at the output side of the rod lens array.

$$MTF(w)=(i(w)\text{max}-i(w)\text{min})/(i(w)\text{max}+i(w)\text{min})\times 100(\%)$$

In the above equation, (w) max and i(w) min respectively represent a maximum and a minimum of the output image responsive to the input image in the grid pattern for a particular spatial frequency w (lp/mm). FIG. 36 shows an example of the values of the MTF obtained by measuring the light intensity at each dot position of the LED head (at each of the positions facing the light emitting elements respectively).

FIGS. 37(a) and 37(b) show light intensity distributions when three consecutive light emitting elements are lit. As shown in FIG. 37, a light intensity distribution of a light emitting element (LED) is analogous to the Gaussian distribution.

In FIG. 37(a), the curves a1, a2, a3 represent light intensity distributions of the lights emitted by the three light emitting elements, and the curve b represents a light intensity distribution of a combination of the lights emitted by the three light emitting elements. As shown in this figure, when the neighboring light emitting elements are lit, the lights emitted by them exert their effects mutually, thereby making the combined distribution as shown by the curve b. The same holds true for the curves a1, a2, a3 and the curve b in FIG. 37(b).

Even if the light emitting elements are configured to form dots (light spots) of a uniform diameter, when neighboring light emitting elements are lit at the same time, the diameters of the dots vary, since their MTF values may vary and therefore each light emitting element receives different influence from adjacent light emitting elements. FIG. 37(a) shows a case where the MTF value of the middle light emitting element is small. If the MTF value is small, it is difficult to form a sharp dot image and the diameters of the dots adjoining the middle dot are increased, since the light emitted by the middle light emitting element exerts large effect on the adjoining dots. FIG. 37(b) shows a case where the MTF value of the middle light emitting element is large. If the MTF value is large, the dot image becomes too sharp and the diameter of the middle dot is increased, since the lights emitted by the adjoining light emitting elements are incorporated into the light emitted by the middle light emitting element. In short, if the MTF value of any of the light emitting elements is different from a normal value, the combined light intensity distribution is distorted whether it is larger or smaller than the normal value.

In order to remove dot-to-dot variation in the diameters due to variations of optical characteristics of the light emitting elements, it is known to correct printing data to be supplied to the light emitting elements in accordance with correcting data so that all the light emitting elements emit the light at the same intensity. The correcting data is obtained by causing the light emitting elements to emit the light one by one and measuring the intensity of the light sequentially. With such correcting data, it is possible to make the diameter of any dot equal to a certain set value as long as each of the light emitting elements emits the light alone. However, there is a problem that the dot diameter variation cannot be resolved to a sufficient degree, since, when neighboring light emitting elements emit the light at the same time, some dots may have diameters that differ from the set value.

The reason is that each of the light intensity distributions of neighboring light emitting elements has effect on the combined light intensity distribution as explained with reference to FIG. 37, and the effect depends on optical characteristics of the rod lenses that vary and intervals between adjacent rod lenses that slightly vary, and therefore the diameters of the formed dots may vary even if the light emitting elements are configured to form light spots having a uniform diameter. As a result, an electrostatic latent image formed on the photosensitive drum is distorted and accordingly a toner image distorted, causing degradation in printing quality.

SUMMARY OF THE INVENTION

The present invention has been made in view of the above-described issue with an object of providing an image forming apparatus capable of suppressing the variation of dot diameters due to the effect of immediately adjoining or neighboring light emitting elements.

This object is achieved by an image forming apparatus including a plurality of driven elements including:

a memory for storing driving data on each of the driven elements for driving the driven elements; and a computing unit that reads, from the memory, driving data on a driven element corresponding to a dot of interest and driving data on at least one driven element corresponding to at least one dot included in an area of predetermined dimensions in which the dot of interest is included, and produces corrected printing data based on the driving data read from the memory and on printing data on the dot of interest input from an external control unit;

the image forming apparatus performing printing by driving the driven element corresponding to the dot of interest by use of the corrected printing data.

The computing unit may average driving data on light emitting elements corresponding to dots included in the area.

The printing data may be either binary data or multivalued data.

The area may be comprised of the dot of interest and adjacent dots adjoining the dot of interest, and the computing unit may produce the corrected printing data based on the driving data on the driven element corresponding to the dot of interest, driving data on driven elements corresponding to the adjacent dots, and the printing data on the dot of interest input from the external control unit.

The area may be comprised of the dot of interest, adjacent dots adjoining the dot of interest, and dots adjoining the adjacent dots, and the computing unit may produce the corrected printing data based on the driving data on the driven element corresponding to the dot of interest, driving data on driven elements corresponding to the adjacent dots, driving data on driven elements corresponding to the dots adjoining the adjacent dots, and the printing data on the dot of interest input from the external control unit.

The area may be comprised of a series of dots to be printed in succession including the dot of interest, and the computing unit may produce the corrected printing data based on the driving data on the driven element corresponding to the dot of interest, driving data on a driven element corresponding to a dot situated at an edge of the area, and the printing data on the dot of interest input from the external control unit.

The computing unit may calculate a sum of values of driving data on driven elements corresponding to dots to be printed within the area, and calculate an average of the values by dividing the sum by the number of the dots to be printed within the area.

The computing unit may subtract a value of the driving data on the driven element corresponding to the dot of interest from the average to make a first value, and add a value of normal driving data to the first value to make a second value as a value of the corrected printing data. The driven elements may be gradation LEDs.

The driven elements may be light emitting elements, and light-condensing members may be provided for condensing lights emitted by the light emitting elements. In this case, the driving data to be stored in the memory can be data based on the intensities of the lights condensed by the light-condensing members.

The image forming apparatus may further comprise a table containing correspondences between light intensities and dot diameters. In this case, the driving data to be stored in the memory can be dot-diameter data obtained by collating the intensities of the lights condensed by the light-condensing members with the dot diameters in the table.

BRIEF DESCRIPTION OF THE DRAWINGS

Embodiments of the invention will now be described by way of example and with reference to the accompanying drawings in which:

FIG. 4 shows a graph explaining a relationship between exposure energy and printing density and a graph explaining a relationship between exposure energy (drive current) and gradation data;

FIG. 8 is an explanatory view of effect of dot diameter correction in the first embodiment;

FIG. 19 is an explanatory view of effect of dot diameter correction in the second embodiment;

FIG. 24 is an explanatory view of effect of dot diameter correction in the third embodiment;

FIG. 29 is an explanatory view of effect of dot diameter correction in the fourth embodiment;

FIG. 37 is an explanatory view of light intensity distributions of light emitting elements;

DESCRIPTION OF THE PREFERRED EMBODIMENTS

A First Embodiment

Figure 1:
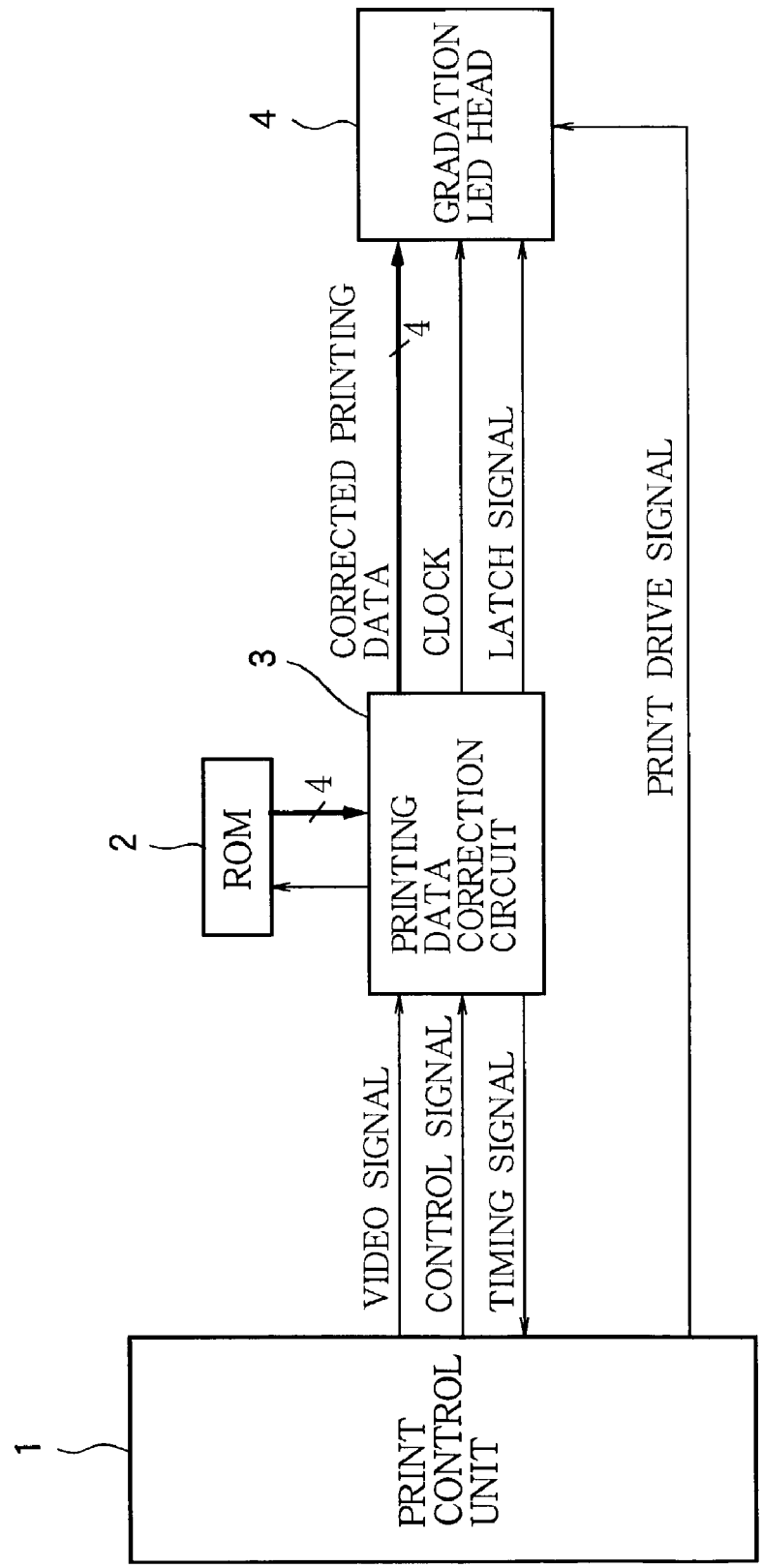
FIG. 1 shows a structure of a first embodiment of the image forming apparatus according to the invention.

FIG. 1 shows a structure of a first embodiment of the image forming apparatus according to the invention. As shown in this figure, the apparatus includes a print control unit 1, a printing data correction circuit 3, a gradation LED head 4, and a non-volatile memory or a ROM 2 (for example, EEPROM). The print control unit 1 supplies the printing data correction circuit 3 with a video signal including printing data and a control signal for controlling the operation of the printing data correction circuit 3. The printing data correction circuit 3 outputs a timing signal for synchronization with the print control unit 1 to the print control unit 1. The printing data correction circuit 3 supplies the gradation LED head 4 with corrected printing data output in synchronization with the timing signal, a latch signal for latching the corrected printing data in the LED head 4, and a clock. The ROM 2 connected to the printing data correction circuit 3 is to store dot diameter data obtained by measuring a diameter of a light spot formed on an image forming plane for each of the light emitting elements of the gradation LED head 4.

A structure of the printing data correction circuit 3 is explained below with reference to FIG. 2. As shown in this figure, the printing data correction circuit 3 includes a buffer 11, one-line receiving buffer 12, a selector 13, a receiving address circuit 14, a sending address circuit 15, a timing preparation circuit 16, latches 18 to 23, a logic operation circuit 24, a dot counter 17, a line counter 25, and a control circuit 26. The one-line receiving buffer 12 is connected to the input and the output of the buffer 11 that receives the video signal from the print control unit 1, and to the output of the selector 13. The two inputs of the selector 13 are connected to the output of the receiving address circuit 14 and the output of the sending address circuit 15 respectively. An output signal of the selector 13 is supplied to the buffer 11 as a buffer switching signal. The input of the receiving address circuit 14 is connected to the output of the timing preparation circuit 16, and the input of the sending address circuit 15 is connected to the output of the dot counter 17.

The timing preparation circuit 16 supplies the timing signal to the print control unit 1, and the print control unit 1 supplies the control signal to the timing preparation circuit 16.

The timing preparation circuit 16 supplies a transfer clock to the gradation LED head 4, the latches 18 to 23, and the dot counter 17. The timing preparation circuit 16 also supplies the latch signal to the gradation LED head 4. The output of the latch 18 is connected to the input of the latch 19 and the input of the logic operation circuit 24, the output of the latch 19 is connected to the input of the latch 20 and the input of the logic operation circuit 24, and the output of latch 20 is connected to the input of the logic operation circuit 24. The buffer 11 is connected to the input of the latch 18. The output of the latch 21 is connected to the input of the latch 22 and the input of the logic operation circuit 24, and the output of the latch 22 is connected to the input of the latch 23 and the input of the logic operation circuit 24. The output of the latch 23 is connected to the input of the logic operation circuit 24.

The ROM2 is connected to the input of the latch 21 and the output of the dot counter 17. The data line that extends from the ROM 2 to the logic operation circuit 24 via the latches 21 to 23 is comprised of four signal wires to enable transmission of 4-bit parallel dot diameter data. The control circuit 26 is connected to the output of the raster line counter 25, the output of the logic operation circuit 24, and the input of the gradation LED head 4. The data line that extends from the logic operation circuit 24 to the gradation LED head 4 via the control circuit 26 is comprised of four signal wires to enable transmission of 4-bit parallel printing data. The line counter 25 is supplied with the latch signal to count the lines up to one page.

Figure 3:
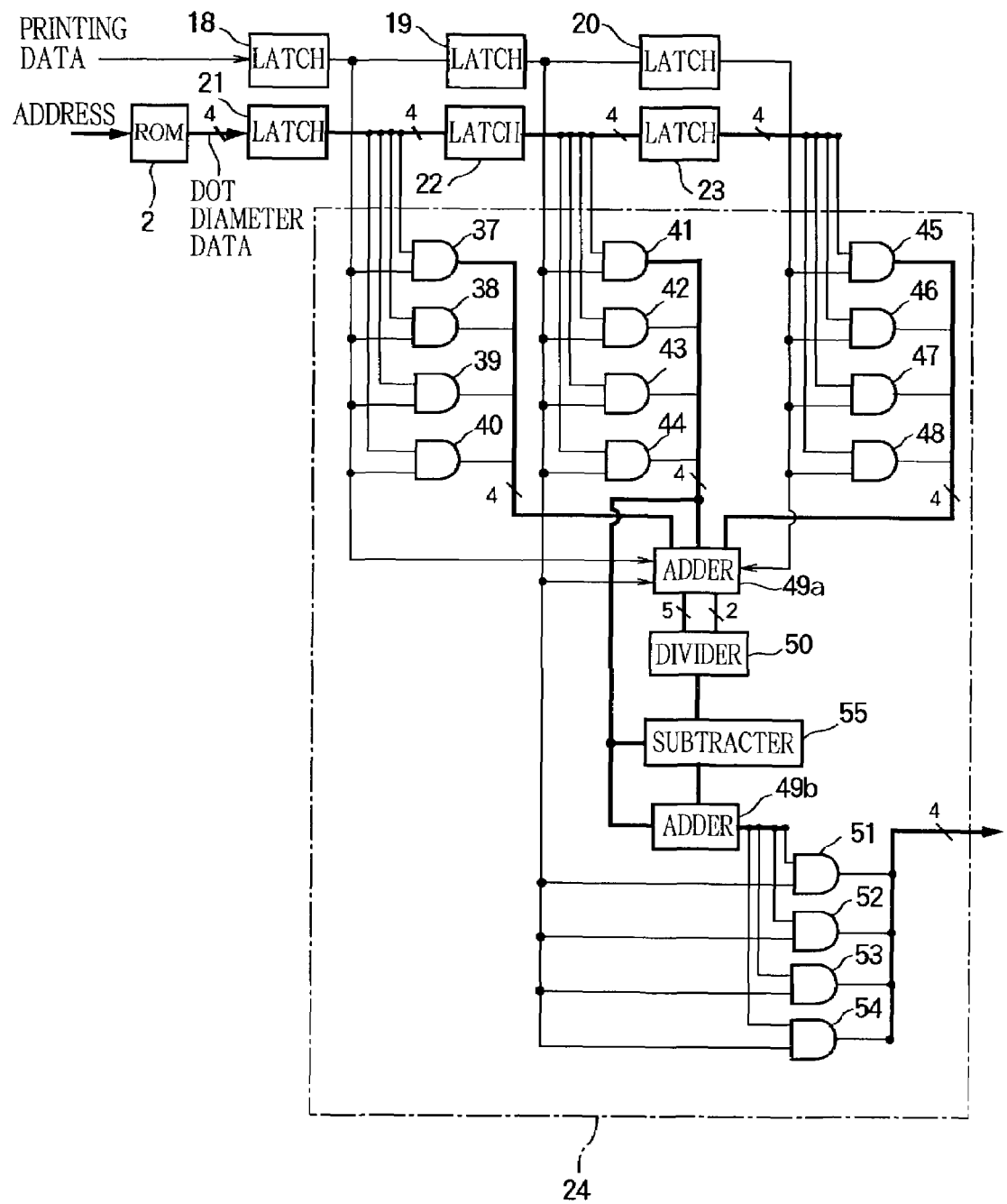
FIG. 3 is a circuit diagram showing a structure of a logic computing device within the printing data correction circuit shown in FIG. 2.

FIG. 3 shows a structure of the logic operation circuit 24. As shown in this figure, the logic operation circuit 24 includes adders 49a, 49b, a divider 50, a subtracter 55, and AND gates 51 to 54.

The AND gates 37 to 40 are supplied with the printing data output from the latch 18 and the 4-bit dot diameter data output from the latch 21. The AND gates 41 to 44 are supplied with the printing data output from the latch 19 and the 4-bit dot diameter data output from the latch 22. The AND gates 45 to 48 are supplied with the printing data output from the latch 20 and the 4-bit dot diameter data output from the latch 23. The output of the AND gates 37 to 40, the output of the AND gates 41 to 44, and the output of the AND gates 45 to 48 are supplied to the adder 49a. The outputs of the latches 18 to 20 are supplied to the adder 49a as well. The output of the AND gates 41 to 44 is supplied to the subtracter 55 and the adder 49b. The adder 49a supplies the divider 50 with 5-bit dot diameter data and after-described 2-bit dot number data. The subtracter 55 supplies the adder 49b with a difference between a result of the division by the divider 50 and the output of the AND gates 41 to 44. The adder 49b adds the output of the subtracter 55 to the output of the AND gates 41 to 44. The AND gates 51 to 54 are supplied with a result of the addition by the adder 49b and the printing data output from the latch 19. The output of the AND gates 51 to 54 is supplied to the control circuit 26 as the printing data.

Figure 5:
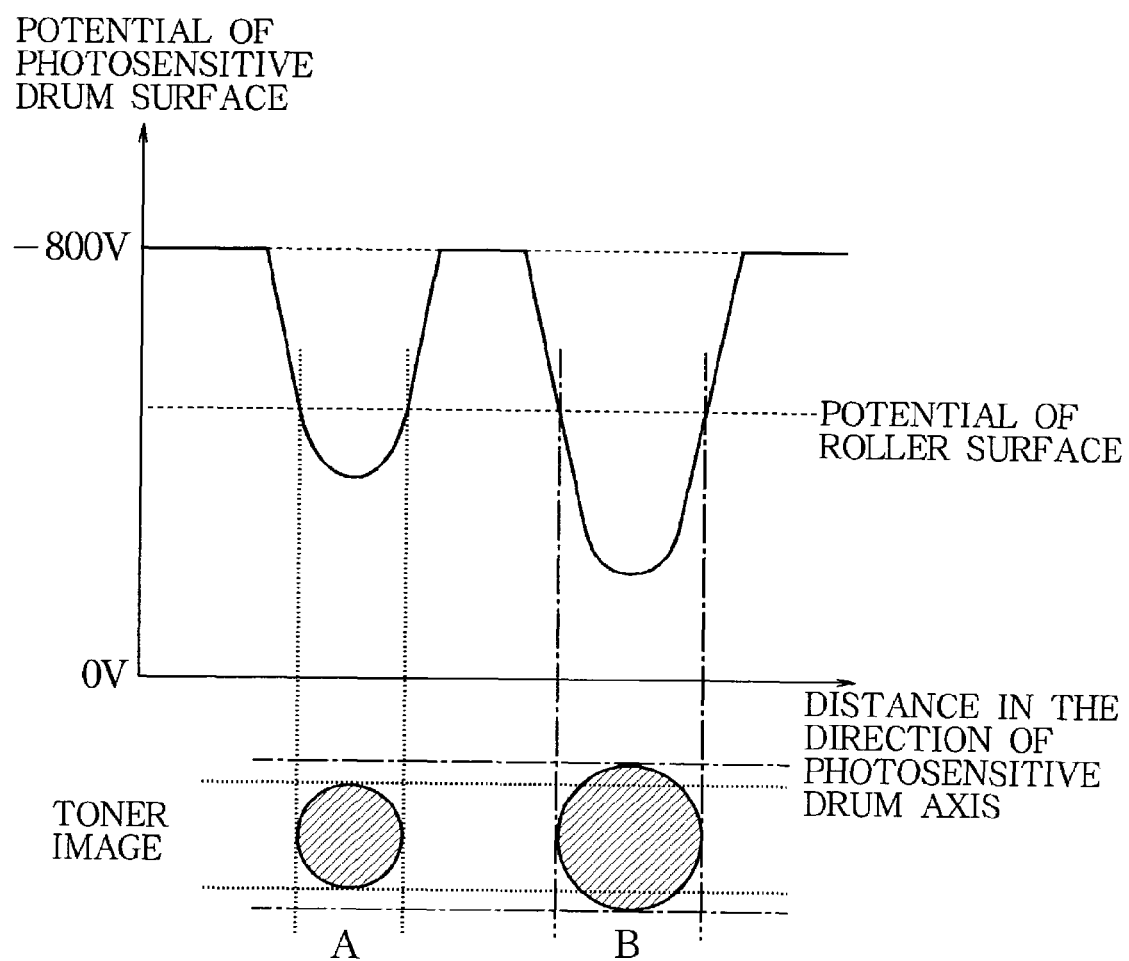
FIG. 5 is a graph explaining a relationship between potential of a photosensitive drum surface and an area of a dot constituting a toner image.

Next, the LED head 4 is explained with reference to FIGS. 4 and 5. The gradation LED head 4 is capable of varying drive currents to be supplied to the light emitting elements (LED) on an individual basis so that a light emission energy (an amount of light exposure energy) can be adjusted on a dot-to-dot basis. As shown in FIG. 4(b), the 4-bit data supplied to the gradation LED head 4 and the LED drive current are in a linear relationship.

On the other hand, an output power of the LED (or an amount of exposure energy applied to the photosensitive drum) varies with the drive current supplied to the LED, and print density varies as shown in FIG. 4(a). When 4-bit input data has a small value, that is, when the output power of the LED is low, a resultant electrostatic latent dot image and a toner dot image have a small diameter as shown by A in FIG. 5. When the 4-bit input data has a large value, that is, when the output power of the LED is high, a resultant electrostatic latent dot image and a toner dot image have a large diameter as shown by B in FIG. 5. As explained above, since the area of a printed dot varies with the output power of the LED, it is possible to control the area of each dot in increments of a certain current adjusting value within a set drive current range.

In this embodiment, the drive current supplied to the LED is set to have normal value (normal density) when the data supplied to the gradation LED head 4 has a value of "1000(08H)", while no drive current is supplied (null density) when the data has a value of "0000(00H)". The value of the drive current increases as the value of the input data increases as "0001 (01H)", "0010 (02H)" . . . , and reaches its maximum when the data has a value of "1111" at which the print density is maximum. In the above, "H" means hexadecimal notation.

The operation of the first embodiment having the above-described structure will be explained below. In FIG. 1, the print control unit 1 sends the timing signal to the not illustrated higher controller when it stands ready to print, and then receives the video signal edited page by page from the higher controller. This video signal is sent from the print control unit 1 to the printing data correction circuit 3 together with the control signal. The printing data correction circuit 3 shown in FIG. 2 performs the following processing upon receiving this video signal. The timing preparation circuit 16 generates a reception clock in response to the control signal, and sends it to the receiving address circuit 14. The video signal received by the buffer 11 is stored at an address within the one-line receiving buffer 12 which the receiving address circuit 14 designates in synchronization with this reception clock. The operation of storing the video signal into the one-line receiving buffer 12 is performed each time one line of the video signal is received from the higher controller.

When the sending address circuit 15 designates row addresses within the one-line receiving buffer 12, the data stored at these addresses are latched by the latches 18 to 20, and then supplied as three consecutive dots to the logic operation circuit 24. The dot counter 17 increments its count value that indicates which dot the printing data just latched corresponds to until all the data within the one-line receiving buffer 12 are latched. The dot counter 17 also supplies the ROM 2 with the address the printing data at which is being supplied to the logic operation circuit 24. Thus, as soon as the printing data is input into the logic operation circuit 24, corresponding dot diameter data is input into the logic operation circuit 24. The logic operation circuit 24 calculates, from the three consecutive dots and 4-bit dot diameter data for each of three consecutive dots, corrected 4-bit printing data comprising four bits on the middle dot of the three consecutive dots.

Here, explanation of the dot diameter data stored in the ROM2 is given. To obtain the dot diameter data, a photometer is placed at a position where the light emitted from the gradation LED head 4 converges. That is, a photometer is placed at a distance equal to the distance between the gradation LED head 4 and the photosensitive drum from the gradation LED head 4. Then, a light emitting element (LED) to be measured is lit, and a diameter of a dot formed by this light emitting element is determined on the basis of intensity of the light received by the photometer. The above procedure is carried out for each of the light emitting elements of the gradation LED head 4. The above procedure for measuring the light intensity is explained in more detail below with reference to FIG. 6.

Figure 6:
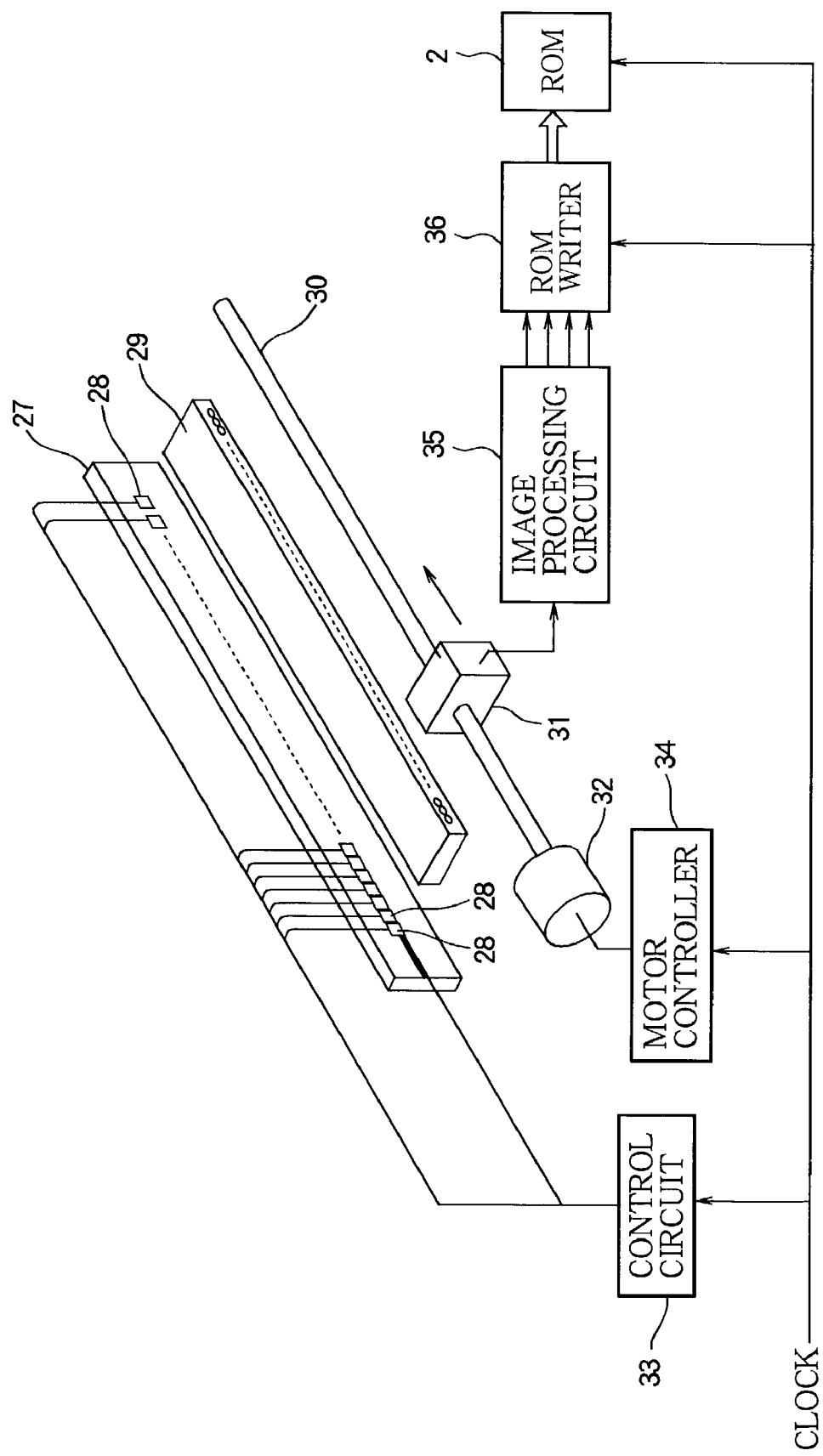
FIG. 6 is an explanatory view of a procedure for obtaining dot diameter data.

In FIG. 6, 27 denotes an LED head board, 28 denotes a light emitting element, 29 denotes a lens array, and 31 denotes a photometer. An output of the photometer 31 is supplied to an image processing circuit 35 to be measured as a light intensity of one dot (light spot) on an image forming plane. Then it is converted into dot diameter data by use of a table containing correspondence between light intensities and dot diameters that can be obtained through experiment. The dot diameter data is sent from the image processing circuit 35 to a ROM writer 36 to be written into the ROM 2 at a predetermined address. The measurement is carried out in succession from a light emitting element situated at one edge of the LED head 4 to a light emitting element situated at the other edge of the LED head 4, whereby dot diameter data are stored in the ROM 2 in succession for all of the light emitting elements.

In FIG. 6, 33 denotes a control circuit for controlling light emission from the LED head 4, 32 denotes a motor for moving the photometer 31, and 34 denotes a motor controller for controlling the motor 32. The motor controller 34 controls the motor 32 to move the photometer 31 along a guide 30 from one end of the LED head 4 to the other end of the LED head 4. At this time, the control circuit 33 causes a light emitting element 28 to be measured, that is, a light emitting element 28 facing the photometer 31 to emit the light. The photometer 31 may measure the intensity of the received light in digital form whose median value is 08H in hexadecimal notation, for example.

The dot image received by the photometer 31 is sent to the image processing circuit 35. Then, the motor controller 34 controls the motor 32 to move the photometer 31 to a position of the next light emitting element, the control circuit 33 causes this light emitting element to emit the light, and the photometer 31 takes in a resultant dot image. The light intensity of the obtained dot image is converted into dot diameter data by use of the table containing correspondence between the light intensities and the dot diameters. The above procedure is carried out for each of the light emitting elements, and as the result, dot diameter data on all of the light emitting elements of the LED head 4 are obtained.

After the dot diameter data on all the light emitting elements of the LED head 4 are obtained, an average value of all the data is calculated. As has been explained with reference to FIG. 4, in this embodiment, a dot density or a dot diameter can be varied on a dot-to-dot basis by varying gradation data supplied to the gradation LED head 4, and the value of gradation data and dot diameter are in a direct proportional relationship. So, to make a dot printed when gradation data having a value of 08H (a median value) is supplied to the gradation LED head 4 have a diameter equal to the average value of the measured dot diameters, necessary settings are made. Let the average value of the measured dot diameters be S8.

Figure 7:
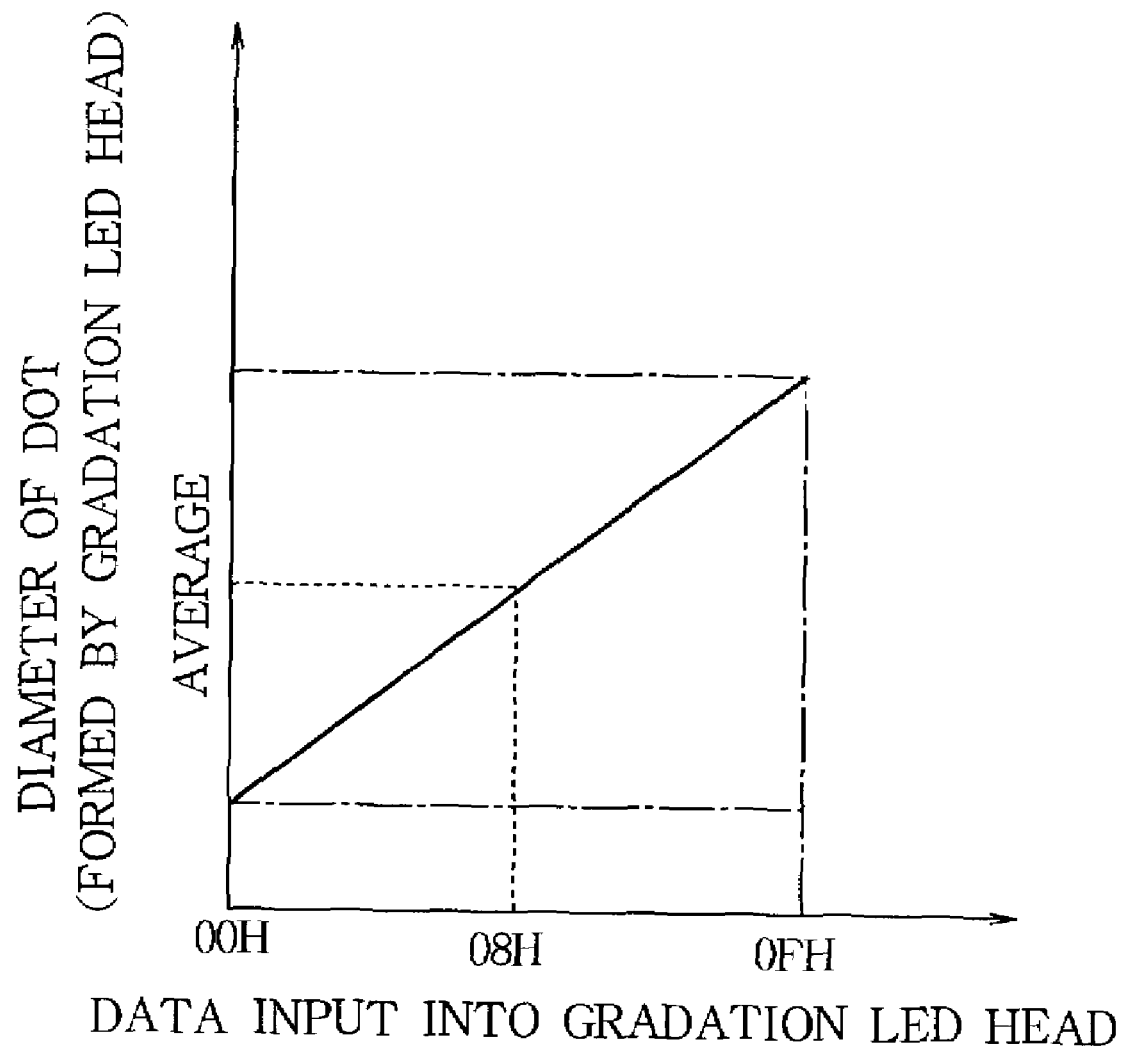
FIG. 7 is a graph explaining a relationship between gradation data and dot diameter in the first embodiment.

When the value of gradation data is varied by a single step of 01H to change from 08H to 09H, if a resultant variation in the dot diameter is $\Delta S$, even when gradation data has a value of any of 01H to FH other than 08H, a resultant variation in the dot diameter is about $\Delta S$ as long as the value of gradation data is varied by a single step of 01H. So, a light emitting element that forms a dot having a diameter larger than the average value by $\Delta S$ is assigned to 8+1=9 as dot diameter data. Likewise, a light emitting element that forms a dot having a diameter smaller than the average value by $2\Delta S$ is assigned to 8-2=6 as dot diameter data. By such assignments of dot diameter data, gradation data and dot diameter data are in such a relationship as shown in FIG. 7. Each of measured dot diameters is converted into dot diameter data having a value in the range of 1 to 15 by use of this relationship. Such a procedure that includes measuring a dot diameter, converting the measurement into dot diameter data, and writing the dot diameter data into the ROM 2 is carried out one by one for all of the light emitting elements of the LED head 4.

Next, the operation of the logic operation circuit 24 will be explained in detail. In FIG. 3, as soon as printing data is input into the latch 18, dot diameter data on a light emitting element to be supplied with this printing data is input into the latch 21 from the ROM 2. So, when three consecutive dots of printing data are stored in the latches 18 to 20 by data shift operation, dot diameter data on three light emitting elements to be supplied with these three consecutive dots of printing data are stored in the latches 21 to 23. At this time, printing data on a dot of interest is stored in the latch 19. The AND gates 37 to 40 supply an AND of the output of the latch 18 and the output of the latch 21 to the adder 49a. The AND gates 41 to 44 supply an AND of the output of the latch 19 and the output of the latch 22 to the adder 49a. The AND gates 45 to 48 supply an AND of the output of the latch 20 and the output of the latch 23 to the adder 49a.

Thus, each of the AND gates 37 to 40, 41 to 44, and 45 to 48 supplies dot diameter data to the adder 49 if the printing data stored in the latch 18, 19 or 20 represents "to be printed", but supplies "0" to the adder 49 if it represents "not to be printed". The adder 49 sums up the outputs of these three AND gate groups and supplies it to the divider 50 as the sum of the dot diameter data. Furthermore, the adder 49a is supplied with the outputs of the latches 18 to 20. The adder 49a determines the number of dots to be printed, that is, the number of dots assigned to the printing data representing "to be printed" by summing up these outputs, and supplies it to the divider 50. The divider 50 divides the sum of the dot diameter data supplied from the adder 49a by the number of dots to be printed supplied from the adder 49a. For example, if all the three dots are assigned to the printing data representing "to be printed", the divider 50 divides the sum of the dot diameter data by three.

A result of the division is supplied to the subtracter 55. Furthermore, the subtracter 55 is supplied with the dot diameter data on the dot of interest from the AND gates 41 to 44. The subtracter 55 subtracts the dot diameter data on the dot of interest from the result of the division. The result of the subtraction is supplied to the adder 49b and added to 08H there. The result of the addition is supplied to the AND gates 51 to 54. The AND gates 51 to 54 outputs the result of the addition to the control circuit 26 only when the output of the latch 19 is "1", that is, only when the dot of interest is to be printed.

As explained above, corrected printing data (gradation printing data) on the dot of interest can be sent to the control circuit 26 by the procedure that includes reading dot diameter data on the dot of interest and two dots adjacent to this dot of interest from the ROM 2, averaging the read data, and adding the difference between the average and the dot diameter data on the dot of interest to 08H. This procedure is repeated until a count value of a row address counter within the sending address circuit 15 reaches a predetermined value, so corrected data are sent to the gradation LED head 4 as actual printing data in succession. By carrying out the procedure for all the dots on the same line, the effect of the MTF value variation can be corrected. The line counter 25 counts the latch signals, and sends a reset signal to the control circuit 26 when the count value reaches the number of lines of one page, so that the above procedure is started from the first line of the next page.

Let the light intensity distributions of three consecutive light emitting elements be as shown by the curves a1, a2, a3 in FIG. 8(a), and the combined light intensity distribution be as shown by the curve b in FIG. 8(a). As shown in FIG. 8(a), the combined light intensity distribution has a distorted profile since the MTF value of the middle light emitting element is small. Assume that the diameters of the dots formed by the above light emitting elements are S8, S8+ΔS, S8 in the direction from left to right, and the values of the dot diameter data on these light emitting elements stored in the ROM 2 are 8, 9, 8 in this direction. In this case, numerical values 8, 9, 8 are input into the logic operation circuit 24 as dot diameter data when the middle dot is a dot of interest. The average value of the dot diameter data corresponding to these three dots is 8, and accordingly subtracting the dot diameter data corresponding to the dot of interest from this average value makes 8−9=−1. The numeral value of 07H resulting from adding the value of −1 to 08H (a normal value) is output to the control circuit 26 as gradation data on the dot of interest. This gradation data has the value of 07H that is smaller than the normal value of 08H, so that as shown in FIG. 8(b), the diameter of the dot of interest, which will be larger than those of the adjacent dots if the above correcting operation is not performed, can be about the same as those of the adjacent dots.

Advantages of the above-described first embodiment will be explained below with reference to FIGS. 9 and 10. Assume that the first, fourth and sixth light emitting elements form dot images having a diameter which is larger than a normal value (08) by ΔS, the second, the third and the seventh light emitting elements form dot images having a diameter which is smaller than the normal value by ΔS, and the fifth light emitting element forms a dot image having a diameter which is equal to the normal value. In this case, dot diameter data stored in the ROM 2 has values 9, 7, 7, 9, 8, 9, 7 for the first to seventh light emitting elements respectively.

As explained above, the logic operation circuit 24 reads dot diameter data on a dot of interest and two dots adjacent to this dot of interest, averages them, subtracts dot diameter data on the dot of interest from the average, adds 08H to the result of the subtraction, and sends the result of the addition to the control circuit 26 as gradation data on the dot of interest.

When a dot of interest is the second, third, fourth, fifth, or sixth dot, the average value is 8, 8, 8, 9, or 8. Subtracting the dot diameter data on the light emitting element forming the dot of interest from each of these average values makes 1, 1, −1, 1, −1. Adding 8 to each of these values makes 9, 9, 7, 9, 7 as gradation printing data on the second to sixth dots. When a special dot having only one adjacent dot (the 1st dot and the 4992nd dot, for example) is the dot of interest, the logic operation circuit 24 performs operation assuming that a dot assigned to the printing data representing "not to be printed" adjoins the dot of interest.

Figure 9:
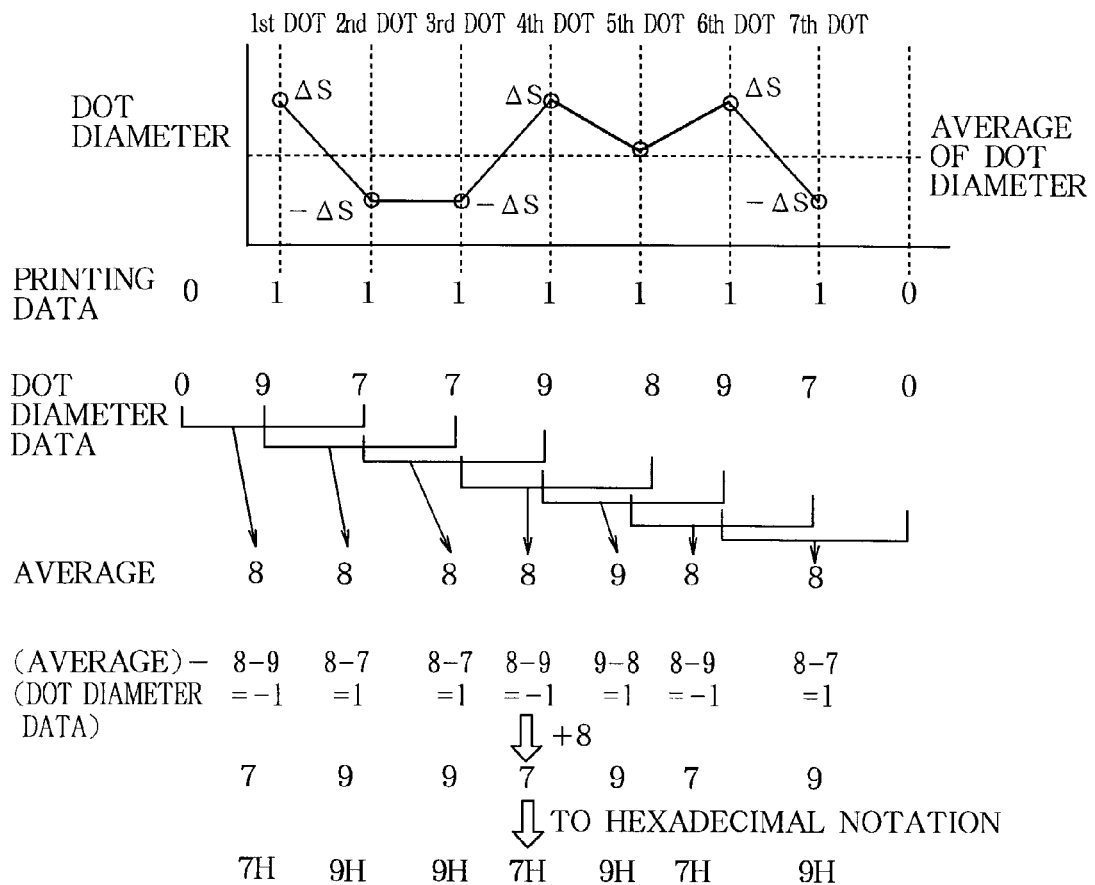
FIG. 9 is an explanatory view of effect of dot diameter correction in the first embodiment.
Figure 10:
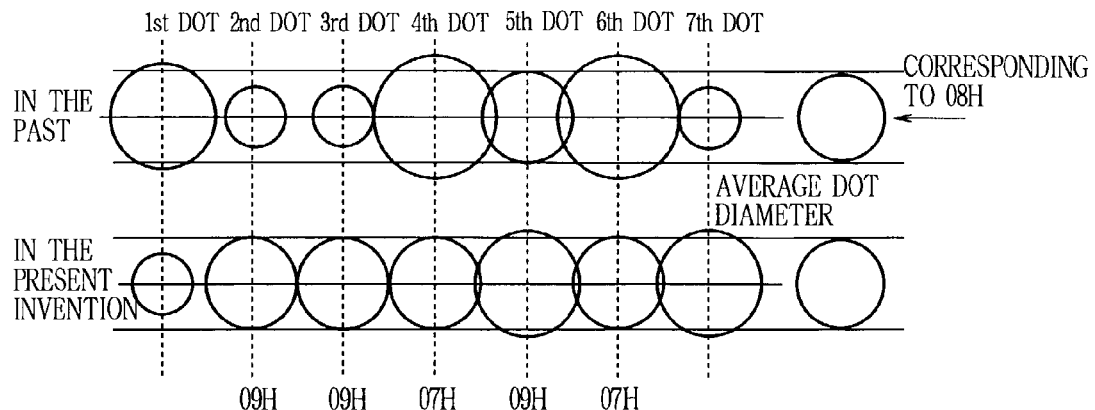
FIG. 10 is an explanatory view of effect of dot diameter correction in the first embodiment.

Accordingly, if the first dot is such a special dot having only one adjacent dot in FIG. 9, when the first dot is the dot of interest, the sum of the dot diameter data on the light emitting elements forming the three consecutive dots is 0+9+7=16, and the average of them is 16/2=8 since the number of the dots assigned to the printing data representing "to be printed" is 2. Subtracting the dot diameter data on the light emitting element forming the dot of interest (the first dot) from the average makes 8−9=−1. Adding the normal value 8 to −1 makes 7 as a value of corrected printing data (printing gradation data) on the first dot. Likewise, if the seventh dot is the special dot having only one adjacent dot, when the seventh dot is the dot of interest, the sum of the dot diameter data on the light emitting elements forming the three consecutive dots is 9+7+0=16, and the average of them is 16/2=8 since the number of the dots assigned to the printing data representing "to be printed" is 2. Subtracting the dot diameter data on the light emitting element forming the dot of interest (the seventh dot) from the average makes 8−7=1. Adding the normal value 8 to 1 makes 9 as a value of corrected printing data (printing gradation data) on the seventh dot.

As a result, the numerical values 7, 9, 9, 7, 9, 7, 9 (actually, 7H, 9H, 9H, 7H, 9H, 7H, 9H after conversion into hexadecimal digits) are sent to the LED head 4 as printing data on the first to seventh dots. In the above explanation, all the dots are assigned to "1" representing "to be printed" as printing data, and the result of the division is rounded up to be an integer. In consequence, as shown in FIG. 10(a), unlike conventional image forming apparatuses where diameters of printed dots vary greatly even though intensities of the lights emitted by light emitting elements are made uniform, it is possible to make diameters of printed dots close to the normal value and to avoid causing a large change in dot diameter between adjacent dots, thereby obtain a smooth printed image.

A Variant of the First Embodiment.

The first embodiment is configured on the assumption that a light intensity distribution of one light emitting element is affected by immediately adjoining light emitting elements. However, it may be affected by more light emitting elements depending on optical characteristics of lenses of a lens array used especially when they have low MTF values.

Figure 11:
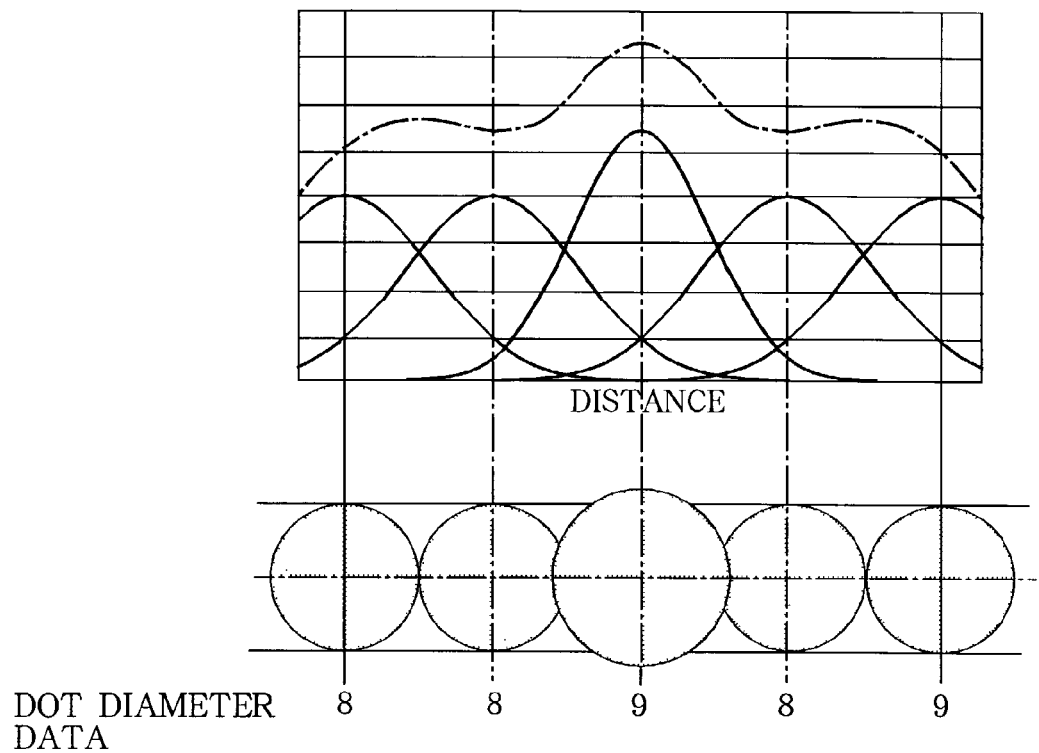
FIG. 11 is an explanatory view of light intensity distributions of light emitting elements in a variant of the first embodiment.
Figure 12:
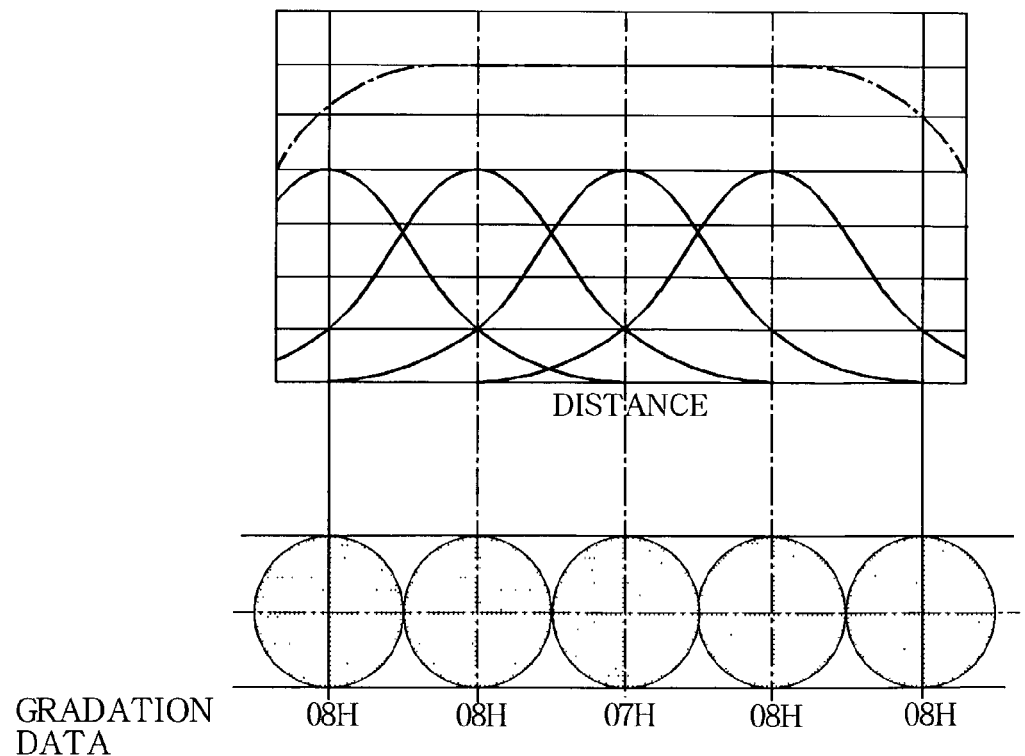
FIG. 12 is an explanatory view of light intensity distributions of light emitting elements in the variant of the first embodiment.

Let's consider two cases where light emitting elements have light intensity distributions as shown in FIG. 11 and FIG. 12 respectively. Each of FIG. 11 and FIG. 12 shows light intensity distributions (solid lines) of five light emitting elements including a light emitting element forming a dot of interest (a middle dot), two light emitting elements forming adjacent dots which immediately adjoin the dot of interest, and two light emitting elements forming dots which immediately adjoin the adjacent dots (referred to as "next-to-adjacent dots" hereinafter).

FIG. 12 explains a case where the lenses of a lens array have a uniform MTF value, and the light intensity distributions have the same profile after the lens array. FIG. 11 explains a case where MTF values of the lenses vary (the MTF value of the lens forming the dot of interest is larger than those of the other lenses), and the light intensity distributions have different profiles after the lens array.

Figure 13:
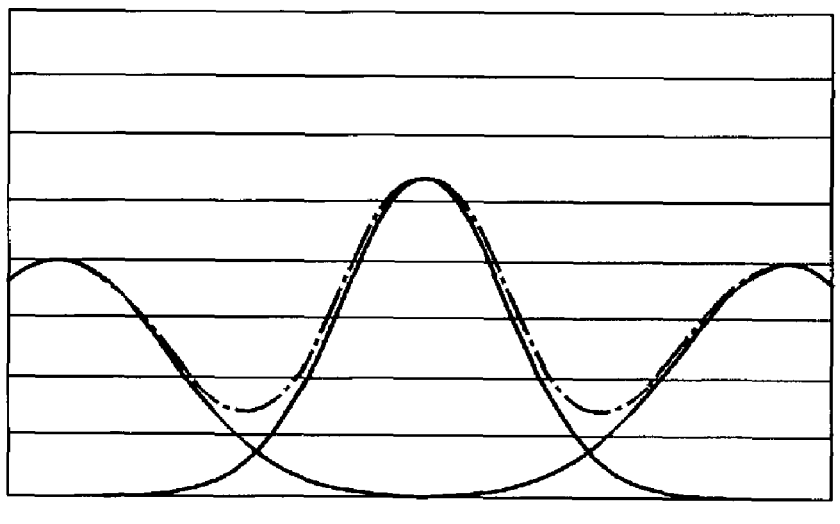
FIG. 13 is an explanatory view explaining that a light intensity distribution of a light emitting element of interest is affected by light emitting elements next to light emitting elements which immediately adjoin the light emitting element of interest.

FIG. 13 shows light intensity distributions when only the light emitting element forming the dot of interest and the light emitting elements forming the next-to-adjacent dots are lit, and the light emitting elements forming the dots immediately adjoining the dot of interest are not lit in the case of FIG. 11.

Figure 14:
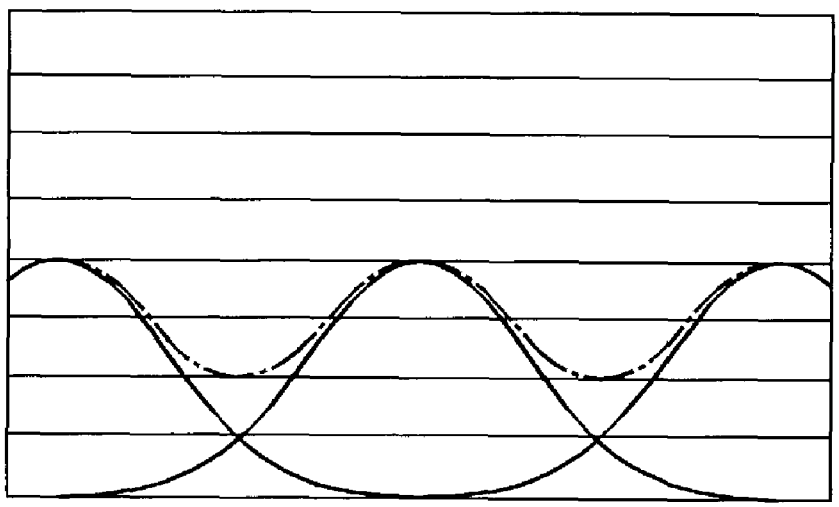
FIG. 14 is an explanatory view explaining that a light intensity distribution of a light emitting element of interest is affected by light emitting elements next to light emitting elements which immediately adjoin the light emitting element of interest.

FIG. 14 shows light intensity distributions when only the light emitting element forming the dot of interest and the light emitting elements forming the next-to-adjacent dots are lit, and the light emitting elements forming the dots immediately adjoining the dot of interest are not lit in the case of FIG. 12. It is apparent that the light intensity distribution of the light emitting element forming the dot of interest is affected by the light emitting elements forming the next-to-adjacent dots.

The variant of the first embodiment is to enable correcting dot diameters allowing for the effect of the light emitting elements forming the next-to-adjacent dots. Therefore, this variant is configured to store the dot diameter data obtained by measuring diameters of dots (light spots) formed by the light emitting elements in the ROM like the first embodiment, and besides to read dot diameter data on the light emitting elements forming the next-to-adjacent dots in addition to the light emitting elements forming the immediately adjoining dots for calculating corrected printing data on the dot of interest. With the variant of the first embodiment, it is possible to obtain smooth printed images even when each light emitting element is affected by the next-to-adjacent dots.

A Second Embodiment

Figure 15:
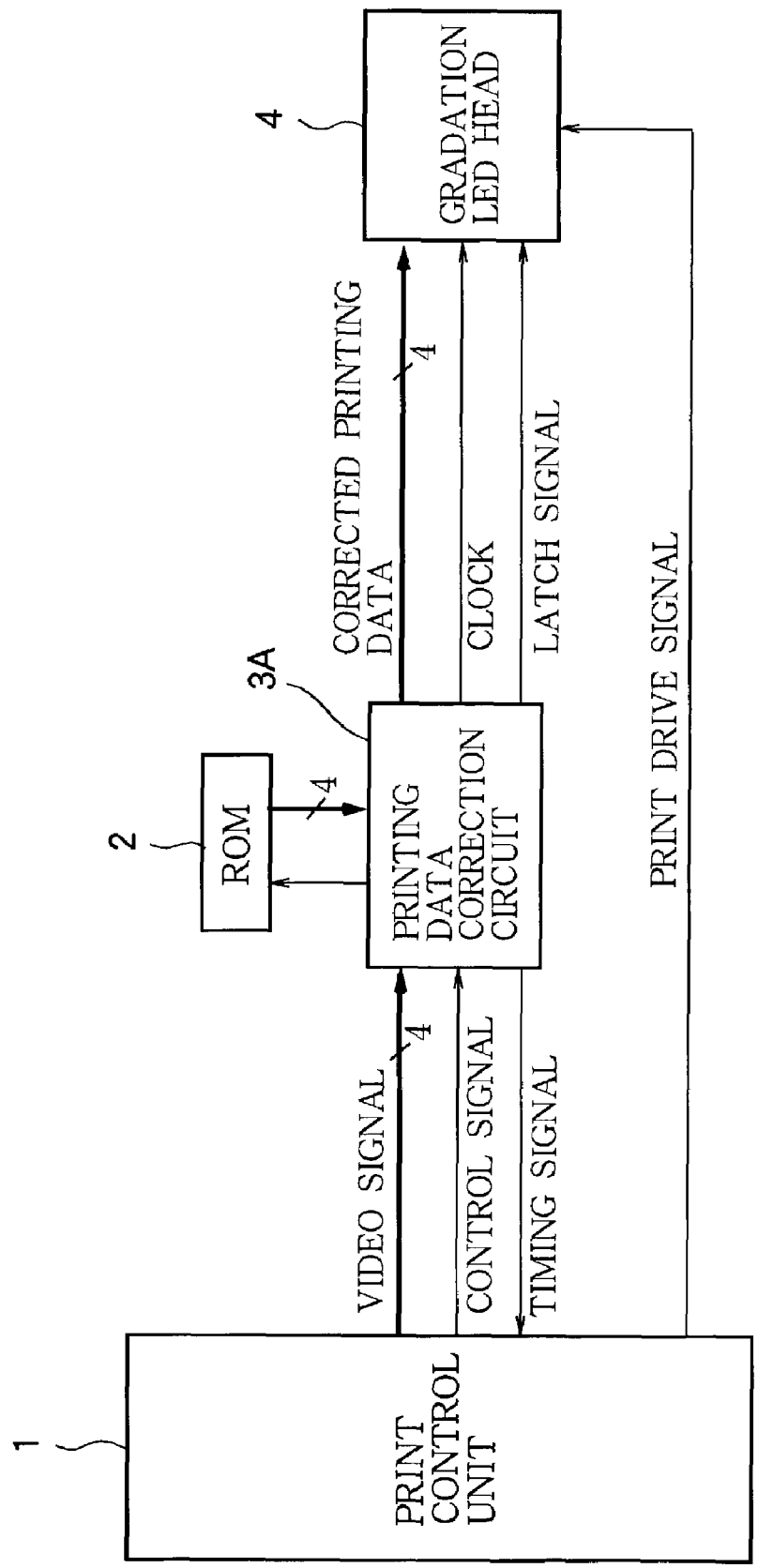
FIG. 15 shows a structure of a second embodiment of the image forming apparatus according to the invention.

FIG. 15 shows a structure of a second embodiment of the image forming apparatus according to the invention. The second embodiment has a structure similar to that of the first embodiment shown in FIG. 1, however, it differs from the first embodiment in that the video signal output from the print control unit to the printing data correction circuit and the printing data are multivalued data and not binary data.

As shown in FIG. 15, the image forming apparatus of the second embodiment includes a print control unit 1, a printing data correction circuit 3A, a gradation LED head 4, and a non-volatile memory or ROM 2 (EEPROM, for example). The print control unit 1 supplies the printing data correction circuit 3A with a video signal including printing data and a control signal for controlling the operation of the printing data correction circuit 3A. The printing data correction circuit 3A outputs a timing signal for synchronization with the print control unit 1 to the print control unit 1. The printing data correction circuit 3A supplies the gradation LED head 4 with corrected printing data output in synchronization with the timing signal, a latch signal for lathing the corrected printing data in the LED head 4, and a clock. The ROM 2 connected to the printing data correction circuit 3A is to store dot diameter data obtained by measuring a diameter of a light spot formed on an image forming plane for each of the light emitting elements of the gradation LED head 4.

Figure 16:
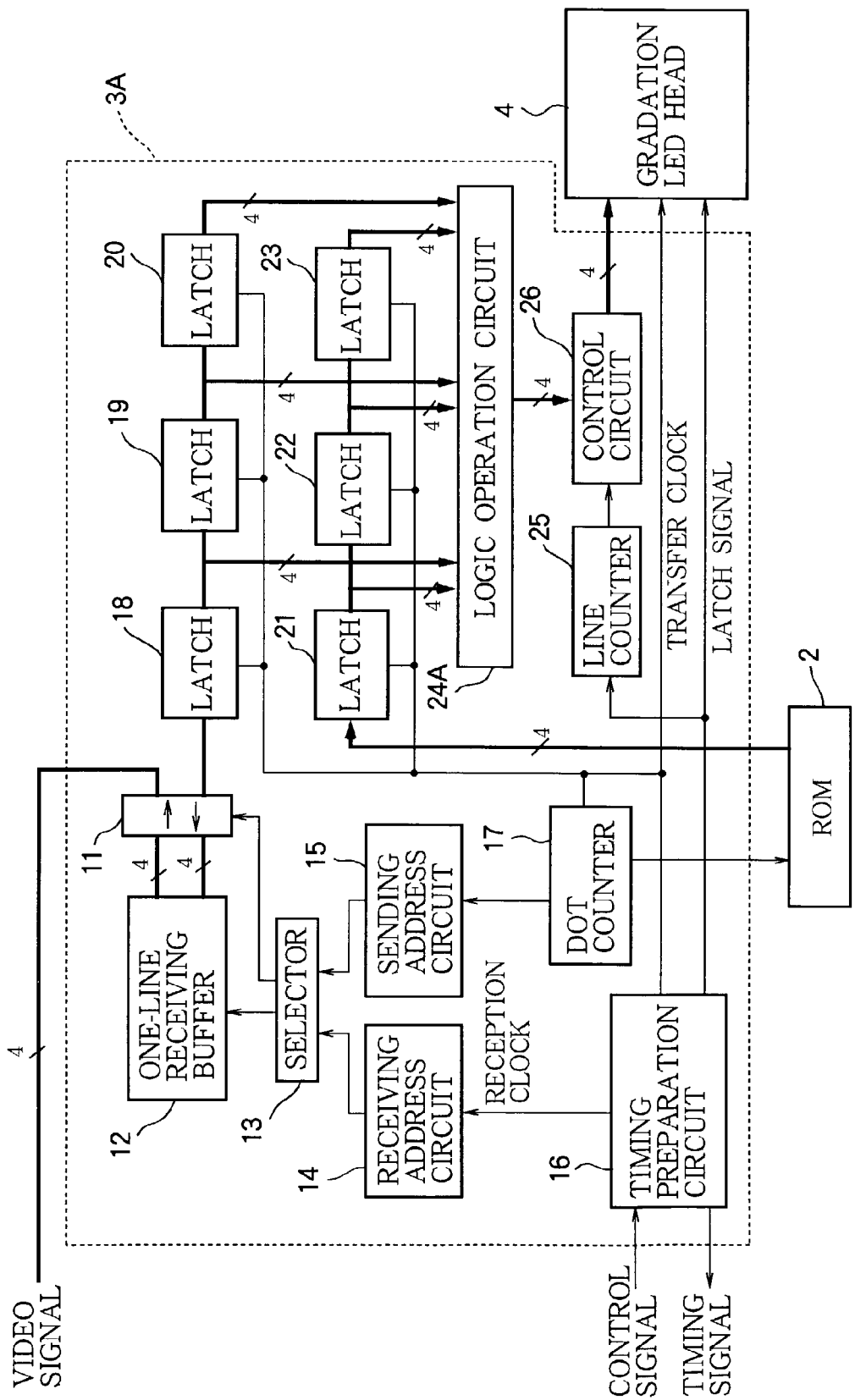
FIG. 16 is a block diagram showing a structure of a printing data correction circuit used in the second embodiment.

A structure of the printing data correction circuit 3A is explained with reference to FIG. 16. Like the printing data correction circuit 3, the printing data correction circuit 3A includes a buffer 11, a one-line receiving buffer 12, a selector 13, a receiving address circuit 14, a sending address circuit 15, a timing preparation circuit 16, latches 18 to 23, a logic operation circuit 24A, a dot counter 17, a line counter 25, and a control circuit 26. The one-line receiving buffer 12 is connected to the input and the output of the buffer 11 that receives the video signal from the print control unit 1, and to the output of the selector 13. The two inputs of the selector 13 are connected to the output of the receiving address circuit 14 and the output of the sending address circuit 15 respectively. An output signal of the selector 13 is supplied to the buffer 11 as a buffer switching signal. The input of the receiving address circuit 14 is connected to the output of the timing preparation circuit 16, and the input of the sending address circuit 15 is connected to the output of the dot counter 17. The timing preparation circuit 16 supplies the timing signal to the print control unit 1, and the print control unit 1 supplies the control signal to the timing preparation circuit 16.

Figure 2:
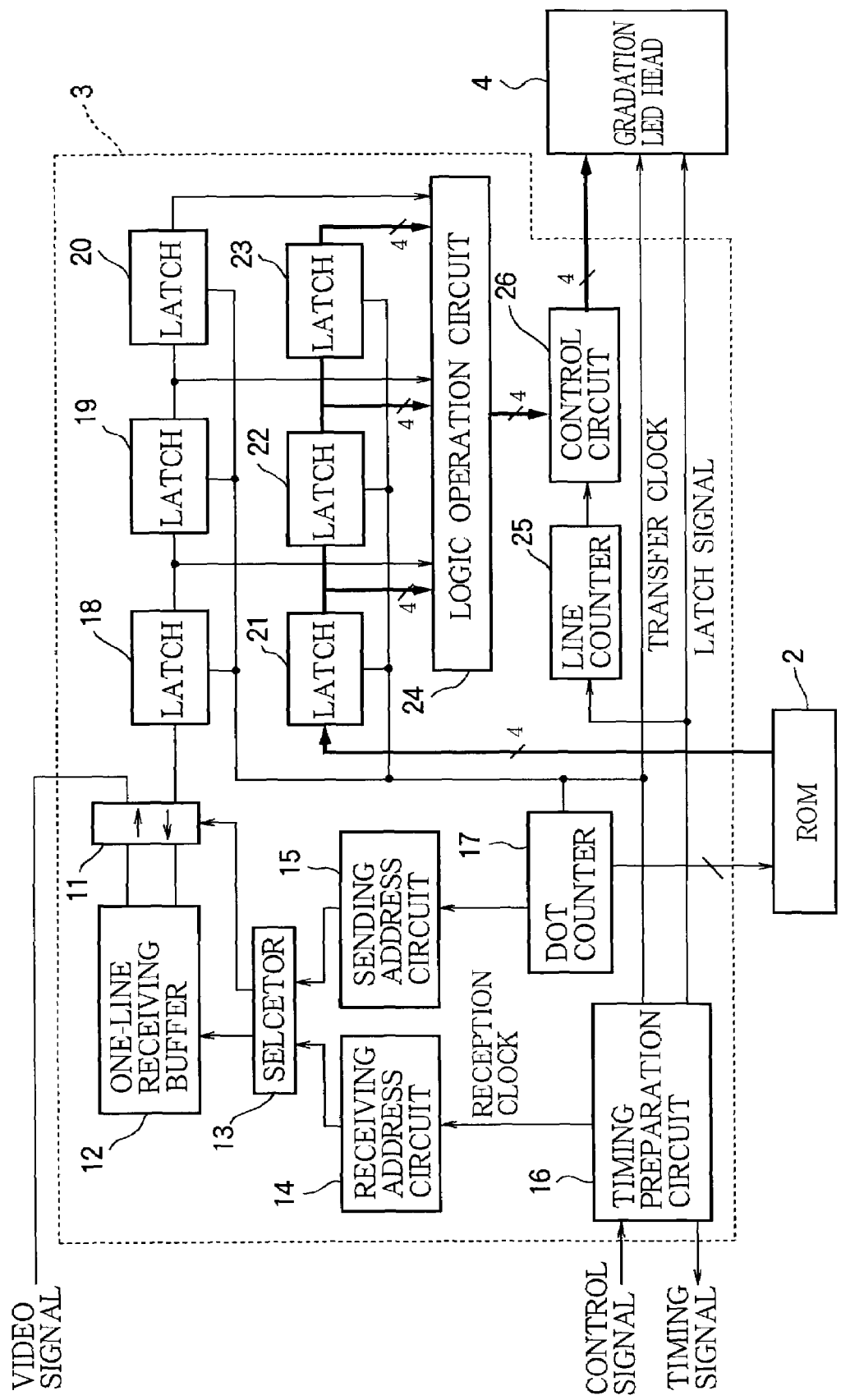
FIG. 2 is a block diagram showing a structure of a printing data correction circuit used in the first embodiment.

The structure of the printing data correction circuit 3A is similar to that of the printing data correction circuit 3 shown in FIG. 2. However, since the printing data transmitted between the buffer 11, the one-line receiving buffer 12, the latches 18 to 20 and the logic operation circuit 24A is not 1-bit data (binary data) but 4-bit data (multivalued data), they are connected with each other by four signal wires.

The timing preparation circuit 16 supplies a transfer clock to the gradation LED head 4, the latches 18 to 23, and the dot counter 17. The timing preparation circuit 16 also supplies the latch signal to the gradation LED head 4. The output of latch 18 is connected to the input of the latch 19 and the input of the logic operation circuit 24A, the output of the latch 19 is connected to the input of the latch 20 and the input of the logic operation circuit 24A, and the output of latch 20 is connected to the input of the logic operation circuit 24A. The buffer 11 is connected to the input of the latch 18. The output of the latch 21 is connected to the input of the latch 22 and the input of the logic operation circuit 24A, and the output of the latch 22 is connected to the input of the latch 23 and the input of the logic operation circuit 24A. The output of the latch 23 is connected to the input of the logic operation circuit 24A.

The ROM2 is connected to the input of the latch 21 and the output of the dot counter 17. The data line that extends from the ROM 2 to the logic operation circuit 24A via the latches 21 to 23 is comprised of four signal wires to enable transmission of 4-bit parallel dot diameter data. The control circuit 26 is connected to the output of the raster line counter 25, the output of the logic operation circuit 24A, and the input of the gradation LED head 4. The data line that extends from the logic operation circuit 24A to the gradation LED head 4 via the control circuit 26 is comprised of a 4-wire signal line to enable transmission of the 4-bit parallel printing data. The line counter 25 is supplied with the latch signal to count the lines up to one page.

Figure 17:
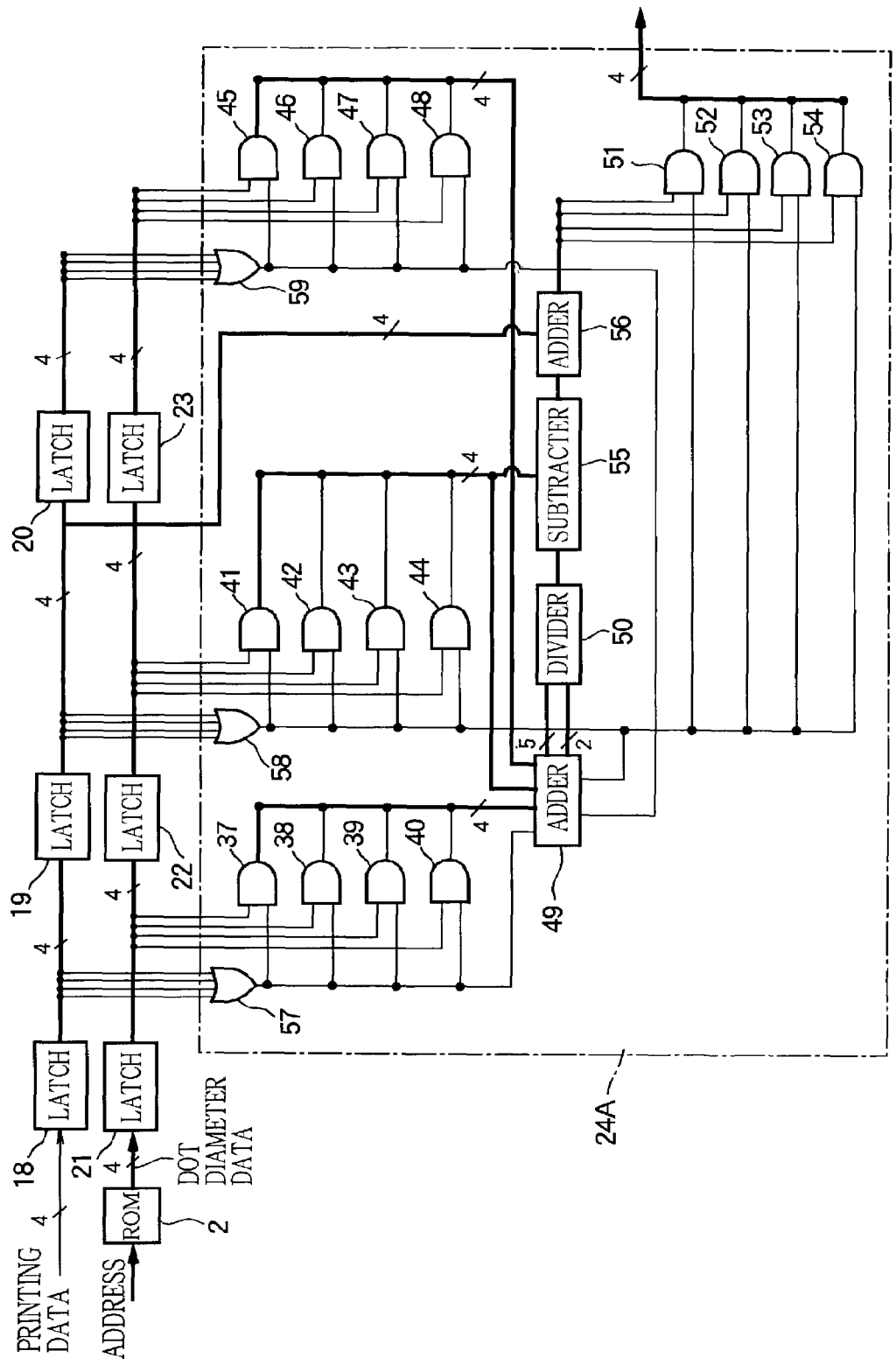
FIG. 17 is a circuit diagram showing a structure of a logic computing device within the printing data correction circuit shown in FIG. 16.

FIG. 17 shows a structure of the logic operation circuit 24A. As shown in this figure, the logic operation circuit 24A includes AND gates 37 to 48, an adder 49, a divider 50, a subtracter 55, an adder 56, AND gates 51 to 54, and OR gates 57 to 59.

The AND gates 37 to 40 are supplied with 4-bit printing data output from the latch 18 through the OR gate 57 and 4-bit dot diameter data output from the latch 21. The AND gates 41 to 44 are supplied with 4-bit printing data output from the latch 19 through the OR gate 58 and 4-bit dot diameter data output from the latch 22. The AND gates 45 to 48 are supplied with 4-bit printing data output from the latch 20 through the OR gate 59 and 4-bit dot diameter data output from the latch 23.

The output of the AND gates 37 to 40, the output of the AND gates 41 to 44, and the output of the AND gates 45 to 48 are supplied to the adder 49. The outputs of the OR gates 57 to 59 are supplied to the adder 49 as well. The adder 49 supplies the divider 50 with 5-bit dot diameter data representing the sum of 4-bit dot diameter data and 2-bit dot number data representing the number of dots to be printed. The divider 50 divides the dot diameter data by the dot number data, and supplies a result of the division to the subtracter 55. The subtracter 55 is also supplied with dot diameter data stored in the latch 22 through the AND gates 41 to 44. The subtracter 55 subtracts the dot diameter data supplied from the AND gates 41 to 44 from the result of the division by the divider 50. The adder 56 is supplied with 4-bit data representing a result of the subtraction by the subtracter 55 and 4-bit printing data (gradation data) output from the latch 19. The adder 56 adds the result of the subtraction by the subtracter 55 to the printing data (gradation data) output from the latch 19. A result of the addition by the adder 56 is supplied to the AND gates 51 to 54 as 4-bit data. The output of the AND gates 51 to 54 is supplied to the control circuit 26 as printing gradation data.

The operation of the second embodiment of the invention having the above-described structure will be explained. In FIG. 15, the print control unit 1 sends the timing signal to the not illustrated higher controller when it stands ready to print, and then receives 4-bit video signal edited page by page from the higher controller. This video signal is sent from the print control unit 1 to the printing data correction circuit 3A together with the control signal. The printing data correction circuit 3A shown in FIG. 16 performs the following processing upon receiving this video signal. The timing preparation circuit 16 generates a reception clock in response to the control signal, and sends it to the receiving address circuit 14. The video signal received by the buffer 11 is stored at an address within the one-line receiving buffer 12 which the receiving address circuit 14 designates in synchronization with this reception clock. The operation of storing the video signal into the one-line receiving buffer 12 is performed each time one line of the video signal is received from the higher controller.

When the sending address circuit 15 designates row addresses within the one-line receiving buffer 12, the data at these addresses are latched by the latches 18 to 20, and then supplied as three consecutive dots to the logic operation circuit 24. The dot counter 17 increments its count value that indicates which dot the printing data just latched corresponds to until all the printing data within the one-line receiving buffer 12 are latched. The dot counter 17 also supplies the ROM 2 with an address at which the dot diameter data corresponding to the printing data that has been input into the logic operation circuit 24A is located. Thus, as soon as printing data is input into the logic operation circuit 24A, corresponding dot diameter data is input into the logic operation circuit 24A.

The logic operation circuit 24A calculates, from the three consecutive dots each of which has four bits and 4-bit dot diameter data for each of the consecutive dots, corrected 4-bit printing data comprising four bits on the middle dot of the three consecutive dots.

The dot diameter data stored in the ROM 2 are obtained by the same procedure as the first embodiment. As explained with reference to FIG. 6, the procedure includes measuring a diameter of a dot (a spot light) formed on an image forming plane for each of the light emitting elements of the LED head, and averaging the measured dot diameters. As has been explained with reference to FIG. 4, a dot density or a dot diameter can be varied on a dot-to-dot basis by varying gradation data supplied to the LED head 4, and the value of gradation data and dot diameter are in a direct proportional relationship. So, to make a dot printed when gradation data having a value of 08H (a median value) is supplied to the gradation LED head 4 have a diameter equal to the average value of the measured dot diameters, necessary settings are made. Let the average value of the measured dot diameters be S8.

Figure 18:
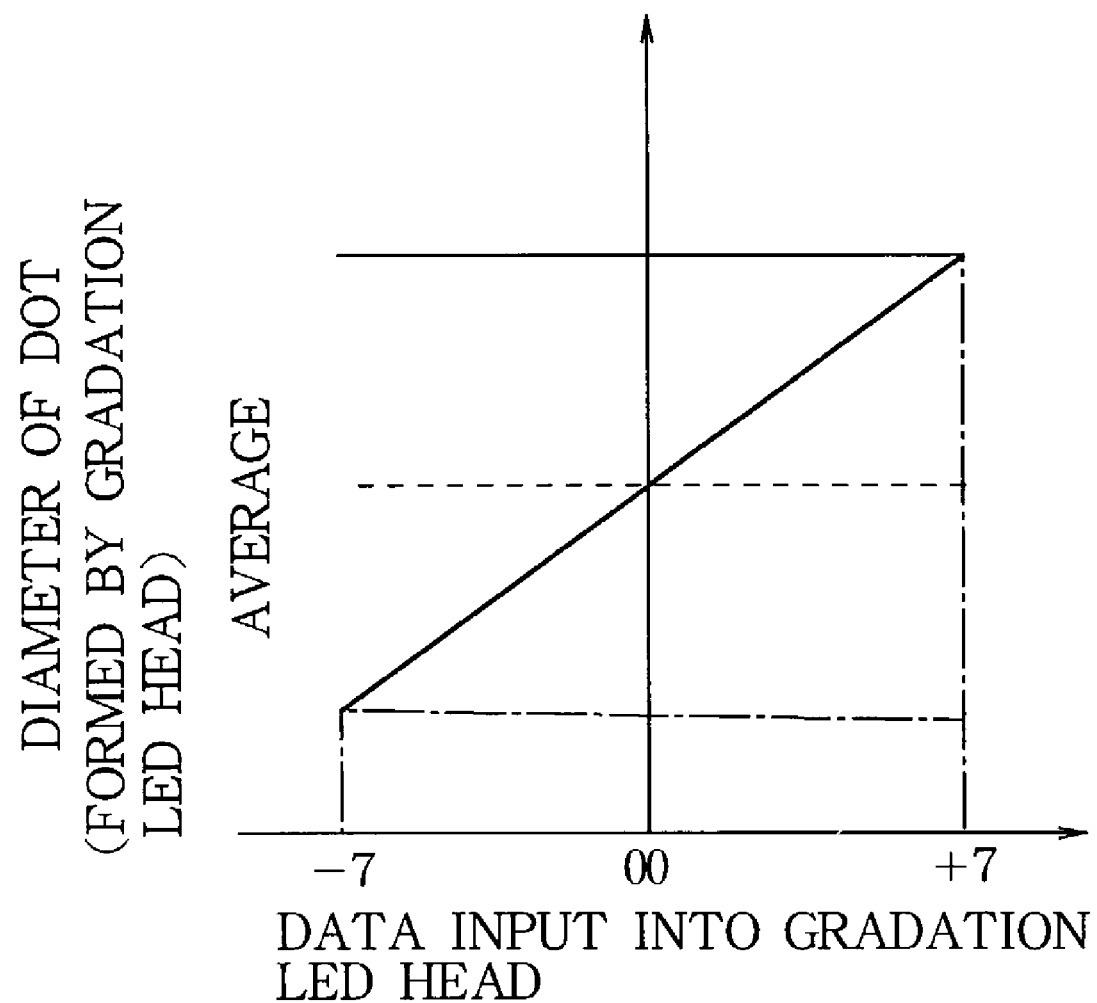
FIG. 18 is a graph explaining a relationship between gradation data and dot diameter in the second embodiment.

When the value of gradation data is varied by a single step of 01H to change from 08H to 09H, if a resultant variation in the dot diameter is ΔS, even when gradation data has a value of any of 01H to FH other than 08H, a resultant variation in the dot diameter is about ΔS as long as the value of gradation data is varied by a single step of 01H. So, a light emitting element that forms a dot having a diameter larger than the average value by ΔS is assigned to 8+1=9 as dot diameter data. Likewise, a light emitting element that forms a dot having a diameter smaller than the average value by 2ΔS is assigned to 8−2=6 as dot diameter data. By such assignments of dot diameter data, gradation data and dot diameter data are in such a relationship as shown in FIG. 18. Each of measured dot diameters is converted into 4-bit gradation data by use of this relationship and stored in the ROM 2 as dot diameter data.

Next, the operation of the logic operation circuit 24A is explained in detail. In FIG. 17, as soon as 4-bit printing data is input into the latch 18, dot diameter data on a light emitting element to be supplied with this printing data is input into the latch 21 from the ROM 2. So, when three consecutive dots of printing data are stored in the latches 18 to 20 by data shift operation, dot diameter data on three light emitting elements to be supplied with these three consecutive dots of printing data are stored in the latches 21 to 23. At this time, printing data on a dot of interest is stored in the latch 19. The AND gates 37 to 40 supply an AND of the output of the latch 18 output through the OR gate 57 and the output of the latch 21 to the adder 49. The AND gates 41 to 44 supply an AND of the output of the latch 19 output through the OR gate 58 and the output of the latch 22 to the adder 49. The AND gates 45 to 48 supply an AND of the output of the latch 20 output through the OR gate 59 and the output of the latch 23 to the adder 49. Thus, each of the AND gates 37 to 40, 41 to 44, and 45 to 48 supplies dot diameter data to the adder 49 if the printing data stored in the latch 18, 19 or 20 represents "to be printed", but supplies "0" to the adder 49 if it represents "not to be printed".

The adder 49 sums up the outputs of these three AND gate groups and supplies it to the divider 50 as the sum of the dot diameter data. The adder 49 is also supplied with the outputs of the OR gates 57 to 59. The adder 49 determines the number of dots to be printed, that is, the number of dots assigned to the printing data representing "to be printed" by summing up these outputs, and supplies it to the divider 50. The divider 50 divides the sum of the dot diameter data supplied from the adder 49 by the number of dots to be printed supplied from the adder 49. For example, if all the three dots are assigned to the printing data representing "to be printed", the divider divides the sum of the dot diameter data by three.

A result of the division is supplied to the subtracter 55. The subtracter 55 subtracts the dot diameter data on the dot of interest supplied through the AND gates 41 to 44 from the result of the division. A result of the subtraction is supplied to the adder 56 and added to the printing data (gradation data) on the dot of interest supplied from the latch 19. A result of the addition by the adder 56 is supplied to the AND gates 51 to 54. The AND gates 51 to 54 outputs the result of the addition to the control circuit 26 only when the output of the OR gate 58 is "1", that is, only when the dot of interest is to be printed.

As explained above, corrected printing data (gradation data) on the dot of interest can be sent to the control circuit 26 by the procedure that includes reading dot diameter data on the dot of interest and dot diameter data on the two adjacent dots from the ROM 2, averaging the read data, and adding the difference between the average and the dot diameter data on the dot of interest to the gradation data on the dot of interest. This procedure is repeated until a count value of a row address counter within the sending address circuit 15 reaches a predetermined value, so corrected data are sent to the gradation LED head 4 as actual printing data in succession. By carrying out the procedure for all the dots on the same line, the effect of the MTF value variation can be corrected.

In the second embodiment, like the first embodiment, when a special dot having only one adjacent dot (the 1st dot and the 4992nd dot, for example) is a dot of interest, the logic operation circuit 24A performs operation assuming that a dot assigned to the printing data representing "not to be printed" adjoins the dot of interest. The line counter 25 counts the latch signals, and sends a reset signal to the control circuit 26 when the count value reaches the number of lines of one page, so that the above procedure is started from the first line of the next page.

Let the light intensity distributions of three consecutive light emitting elements be as shown by the curves a1, a2, a3 in FIG. 19(a), and the combined light intensity distribution be as shown by the curve b in FIG. 19(a). As shown in FIG. 19(a), the combined light intensity distribution has a distorted profile since the MTF value of the middle light emitting element is large. Assume that the value of the gradation data on the dot of interest (the middle dot) is 08H before correction, and the values of the dot diameter data stored in the ROM 2 on these dots shown in FIG. 19(a) are 8, 10, 8 from left to right.

The logic operation unit 24A calculates the difference between the average of the data on these dots which is equal to 9 and the dot diameter data on the dot of interest. The sum of a result of this calculation and the gradation data on the dot of interest, which equals to 08H+(−01H)=07H, is supplied to the control circuit 26 as corrected gradation data. The value of this corrected gradation data is smaller than the value of the original gradation data on the dot of interest, so that as shown in FIG. 19(b), the dot diameter of the dot of interest, which will be larger than those of the adjacent dots if the above correcting operation is not performed, can be about the same as those of the adjacent dots.

As in the case of the first embodiment, in this the second embodiment, unlike conventional image forming apparatuses where diameters of printed dots vary greatly even though the intensities of the lights emitted by light emitting elements are made uniform, it is possible to make diameters of the printed dots close to the normal value and to avoid causing a large change in dot diameter between adjacent dots, thereby obtain a smooth printed image.

Generally, when a minute isolated area (an area comprising 3×3 dots or smaller) is printed as a toner image, the diameters of dots constituting the toner image are small since adherence of toner particles is low for such a minute isolated area. The second embodiment has another advantage that it is possible to prevent dots within such a minute isolated area from having small diameters since dot diameter data on adjacent dots are averaged.

A Third Embodiment

The above described embodiments can suppress the effect of the lens-to-lens variation in the MTF value for each of relatively small areas constituting a print pattern. However, the effect is not removed sufficiently when the print pattern, which occupies a relatively large area, is viewed as a whole. Accordingly, a third embodiment of the invention is configured to correct diameters of dots constituting a pattern of a certain area in a lot to remove the effect of the lens-to-lens variation in the MTF value.

Figure 20:
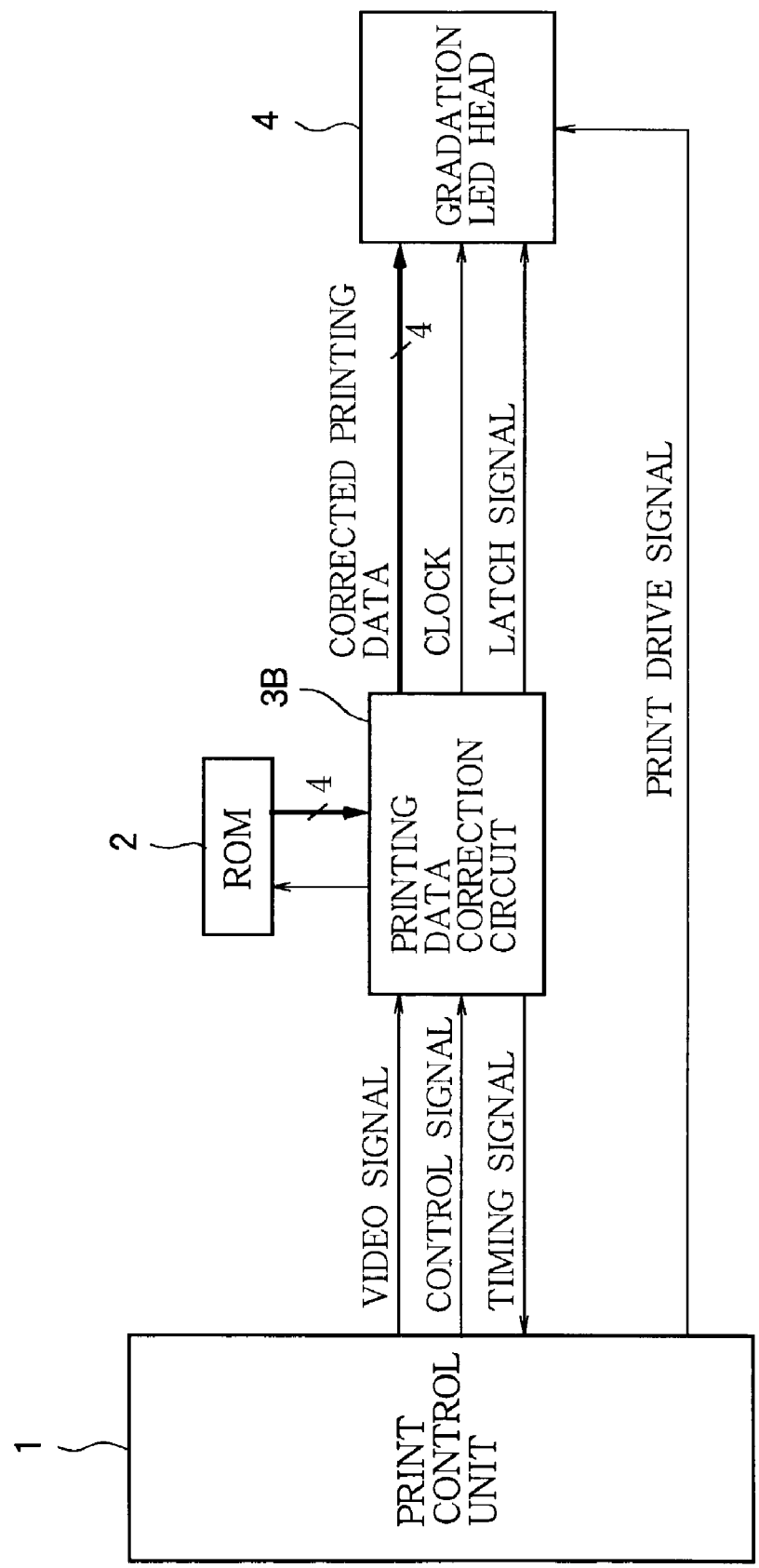
FIG. 20 shows a structure of a third embodiment of the image forming apparatus according to the invention.

FIG. 20 shows a structure of the third embodiment of the image forming apparatus according to the invention. As shown in FIG. 20, this apparatus includes a print control unit 1, a printing data correction circuit 3B, a gradation LED head 4, and a non-volatile memory device or ROM 2 (EEPROM, for example). The print control unit 1 supplies the printing data correction circuit 3B with a video signal including printing data and a control signal for controlling the operation of the printing data correction circuit 3B. The printing data correction circuit 3B outputs a timing signal for synchronization with the print control unit 1 to the print control unit 1. The printing data correction circuit 3B supplies the gradation LED head 4 with corrected printing data output in synchronization with the timing signal, a latch signal for latching the corrected printing data in the LED head 4, and a clock. The ROM 2 connected to the printing data correction circuit 3B is to store dot diameter data obtained by measuring a diameter of a light spot formed on an image forming plane for each of the light emitting elements of the gradation LED head 4.

Figure 21:
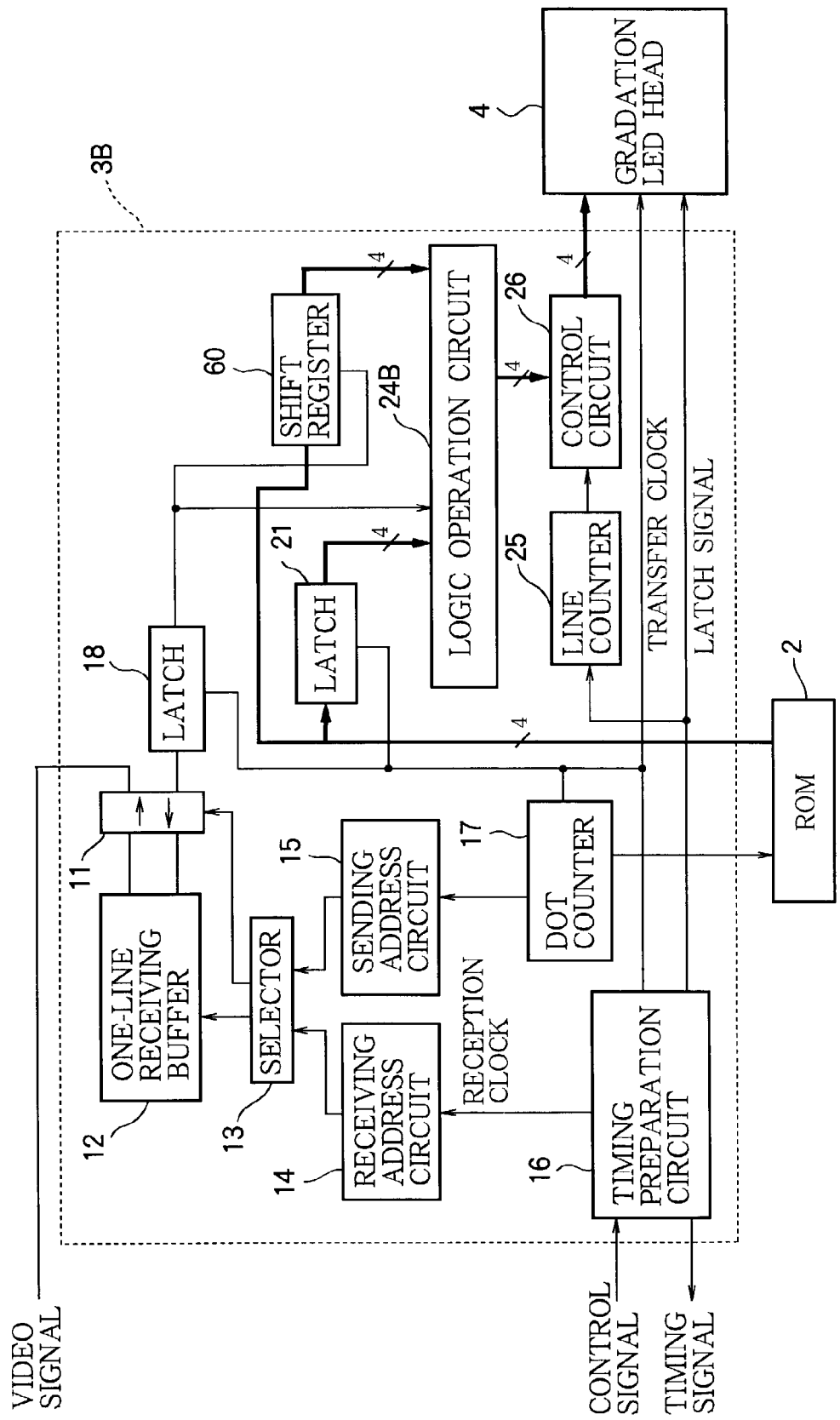
FIG. 21 is a block diagram showing a structure of a printing data correction circuit used in the third embodiment.

A structure of the printing data correction circuit 3B is explained below with reference to FIG. 21. As shown in FIG. 21, the printing data correction circuit 3B includes a buffer 11, a one-line receiving buffer 12, a selector 13, a receiving address circuit 14, a sending address circuit 15, a timing preparation circuit 16, latches 18, 21, a shift register 60, a logic operation circuit 24B, a dot counter 17, a line counter 25, and a control circuit 26. The one-line receiving buffer 12 is connected to the input and the output of the buffer 11 that receives the video signal from the print control unit 1, and to the output of the selector 13. The two inputs of the selector 13 are connected to the output of the receiving address circuit 14 and the output of the sending address circuit 15 respectively. An output signal of the selector 13 is supplied to the buffer 11 as a buffer switching signal. The input of the receiving address circuit 14 is connected to the output of the timing preparation circuit 16, and the input of the sending address circuit 15 is connected to the output of the dot counter 17. The timing preparation circuit 16 supplies the timing signal to the print control unit 1, and the print control unit 1 supplies the control signal to the timing preparation circuit 16.

The timing preparation circuit 16 supplies a transfer clock to the gradation LED head 4, the latches 18, 21, and the dot counter 17. The timing preparation circuit 16 also supplies the latch signal to the gradation LED head 4. The output of the latch 18 is connected to the clock input terminal of the shift resister 60 and the input of the logic operation circuit 24B, and the output of the shift register 60 is connected to the input of the logic operation circuit 24B. The buffer 11 is connected to the input of the latch 18. The output of the latch 21 is connected to the input of the logic operation circuit 24B. The ROM2 is connected to the input of the latch 21, the input of the shift register 60, and the output of the dot counter 17. The data line that extends from the ROM 2 to the logic operation circuit 24B via the latch 21 and the shift register 60 is comprised of four signal wires to enable transmission of 4-bit parallel dot diameter data. The control circuit 26 is connected to the output of the raster line counter 25, the output of the logic operation circuit 24B, and the input of the gradation LED head 4. The data line that extends from the logic operation circuit 24B to the gradation LED head 4 via the control circuit 26 is comprised of four signal wires to enable transmission of 4-bit parallel printing data. The line counter 25 is supplied with the latch signal to count the lines up to one page.

Figure 22:
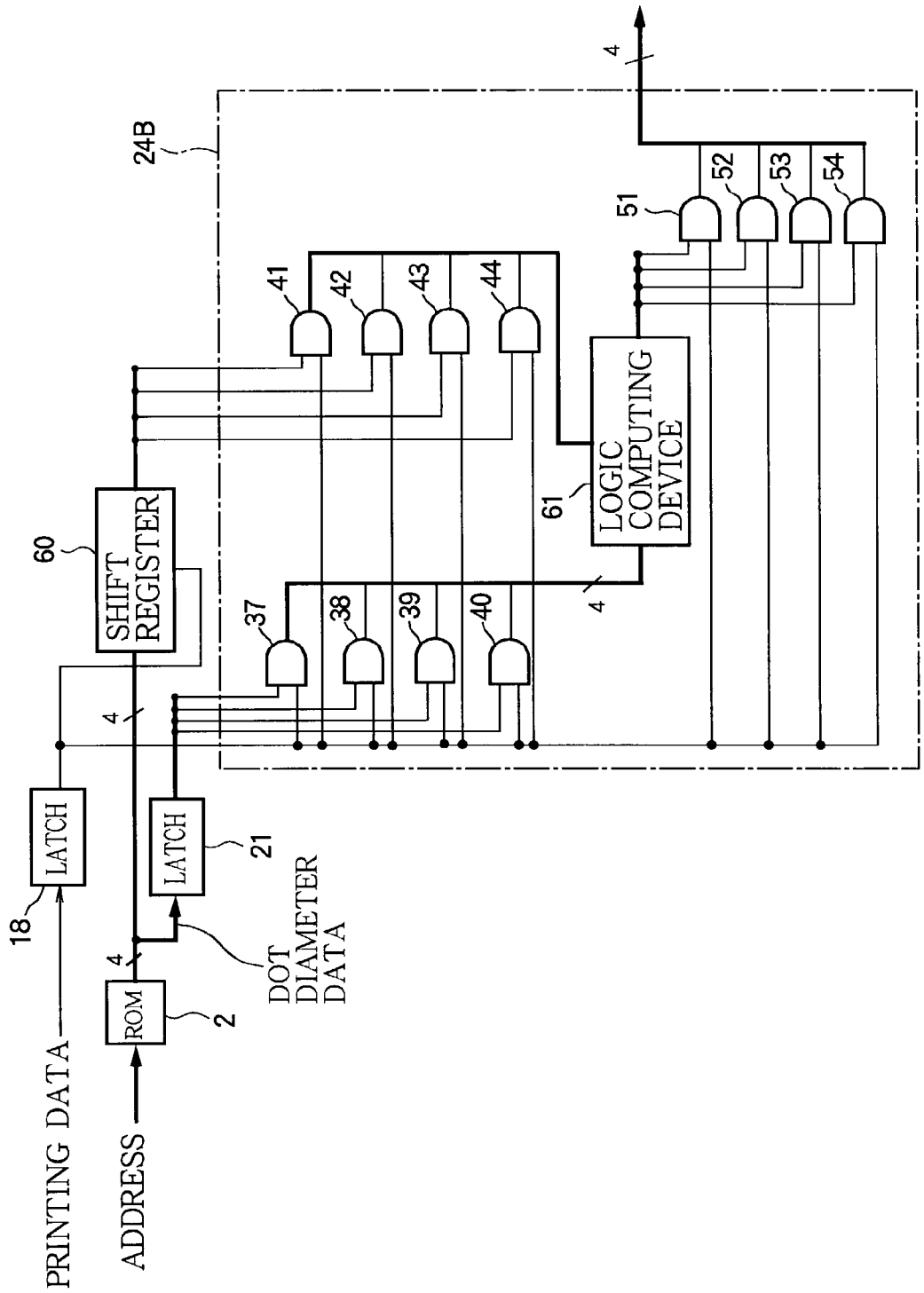
FIG. 22 is a circuit diagram showing a structure of a logic computing device within the printing data correction circuit shown in FIG. 21.

FIG. 22 shows a structure of the logic operation circuit 24B. As shown in FIG. 22, the logic operation circuit 24B includes AND gates 37 to 44, a logic computing device 61, and AND gates 51 to 54.

The AND gates 37 to 40 are supplied with the printing data output from the latch 18 and the 4-bit dot diameter data output from the latch 21. The AND gated 41 to 44 are supplied with 4-bit dot diameter data output from the shift register 60 and printing data output from the latch 18. The output of the AND gates 37 to 40 and the output of the AND gates 41 to 44 are supplied to the logic computing device 61. The AND gates 51 to 54 are supplied with the output of the logic computing device 61 and the printing data output from the latch 18. The output of the AND gates 51 to 54 is supplied to the control circuit 26 as printing gradation data.

The operation of the third embodiment having the above described structure will be explained in detail. In FIG. 20, the print control unit 1 sends the timing signal to the not illustrated higher controller when it stands ready to print, and then receives the video signal edited page by page from the higher controller. This video signal is sent from the print control unit 1 to the printing data correction circuit 3B together with the control signal. The printing data correction circuit 3B shown in FIG. 21 performs the following processing upon receiving this video signal. The timing preparation circuit 16 generates a reception clock in response to the control signal, and sends it to the receiving address circuit 14. The video signal received by the buffer 11 is stored at an address within the one-line receiving buffer 12 which the receiving address circuit 14 designates in synchronization with this reception clock. The operation of storing the video signal into the one-line receiving buffer 12 is performed each time one line of the video signal is received from the print control unit 1.

When the sending address circuit 15 designates a row address within the one-line receiving buffer 12, the data at this address is latched by the latch 18. The data output from the latch 18 is supplied to the logic operation circuit 24B.

The dot counter 17 increments its count value that indicates which dot the printing data just latched corresponds to until all the data within the one-line receiving buffer 12 are latched. The dot counter 17 also supplies the ROM 2 with the address the dot diameter data at which corresponds to the printing data being supplied to the logic operation circuit 24B. Thus, as soon as printing data is input into the logic operation circuit 24B, corresponding dot diameter data is input into the logic operation circuit 24B from the ROM 2 through the latch 21. The logic operation circuit 24B calculates, from 1-bit printing data output from the latch 18 and 4-bit dot diameter data output from the latch 21 and the shift register 60 respectively, corrected printing data comprising four bits on the dot assigned to this 1-bit printing data.

Here, explanation of the dot diameter data stored in the ROM2 is given. As explained with reference to FIG. 6, the procedure that includes measuring a diameter of a dot (a spot light) formed on an image forming plane for each of the light emitting elements of the LED head 4, and averaging the measured dot diameters is carried out in the third embodiment as well. As has been explained with reference to FIG. 4, a dot density or a dot diameter can be varied on a dot-to-dot basis by varying gradation data supplied to the LED head 4, and the value of gradation data and dot diameter are in a direct proportional relationship. So, to make a dot printed when gradation data having a value of 08H (a median value) is supplied to the gradation LED head 4 have a diameter equal to the average value of the measured dot diameters, necessary settings are made. Let the average value of the measured dot diameters be S8.

Figure 23:
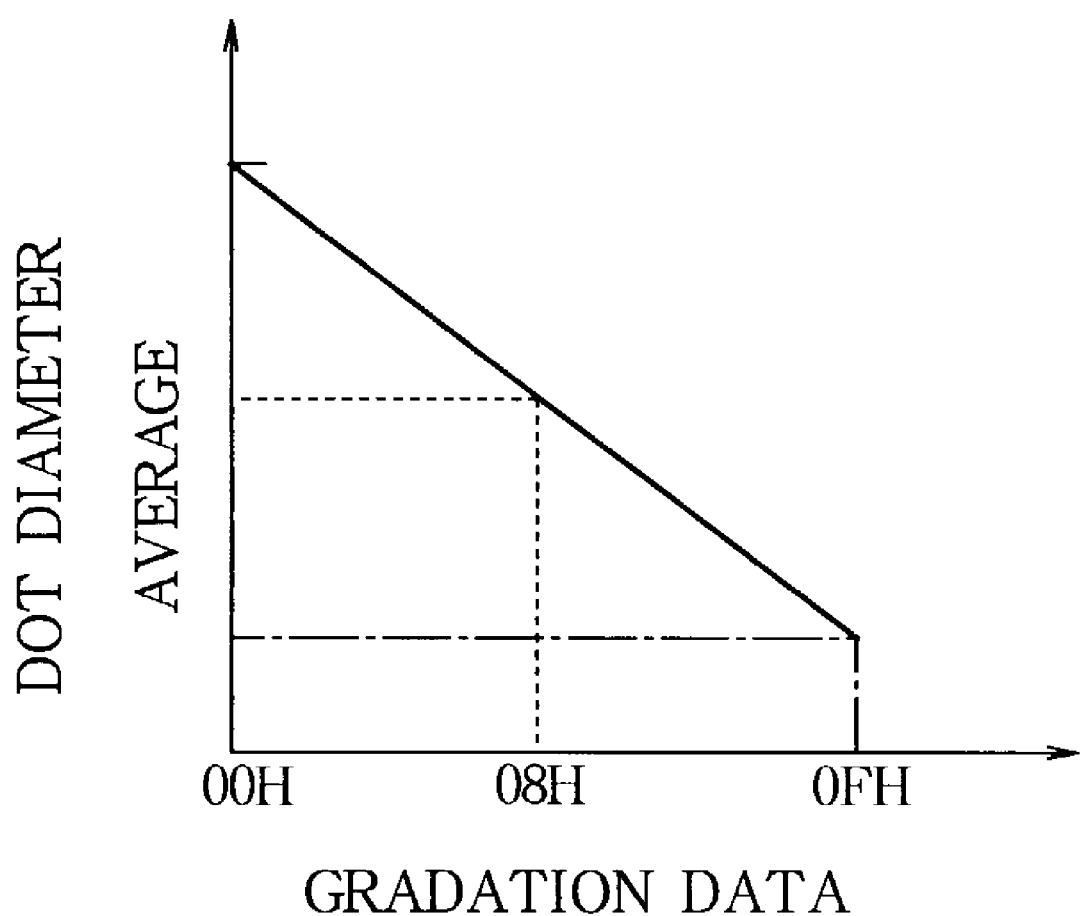
FIG. 23 is a graph showing a relationship between gradation data and dot diameter in the third embodiment.

When the value of gradation data is varied by a single step of 01H to change from 08H to 09H, if a resultant variation in the dot diameter is ΔS even when the gradation data has a value of any of 01H to FH other than 08H, a resultant variation in the dot diameter is about ΔS as long as the value of gradation data is varied by a single step of 01H. So, a light emitting element that forms a dot having a diameter larger than the average value by ΔS is assigned to 08H−01H=07H as dot diameter data. Likewise, a light emitting element that forms a dot having a diameter smaller than the average value by 2ΔS is assigned to 08H+02H=0AH as dot diameter data. By such assignments of dot diameter data, gradation data and dot diameter data are in such a relationship as shown in FIG. 23. Each of measured dot diameters is converted into 4-bit gradation data by use of this relationship and stored in the ROM 2 as dot diameter data.

The operation of the logic operation circuit 24B will be explained in detail. In FIG. 22, as soon as printing data is input into the latch 18, dot diameter data on a light emitting element to be supplied with this printing data is input into the latch 21 from the ROM 2. The shift register 60 holds dot diameter data on a first dot of a series of dots all assigned to the printing data of "1" representing "to be printed". At this time, the logic computing device 61 receives dot diameter data held within the shift register 60 and dot diameter data on a dot of interest.

Here, assume that printing data on a dot having a dot number N−1 is newly input, and this new printing data is "0". The output of the latch 18 is "0" at this moment, so the output of the AND gates 51 to 54 is "0", and therefore this dot is not printed. Then, if printing data of "1" on a dot having a dot number N is input, the output of the latch 18 becomes "1" and dot diameter data on the dot having the dot number N is output from the latch 21. Since the latch 18 outputs "1" to the clock input terminal of the shift register 60 at this time, the dot diameter data on the dot having the dot number N is supplied to the logic computing device 61 from the shift register 60 via the AND gates 41 to 44. Furthermore, the output of the AND gates 37 to 40 is supplied to the logic computing device 61 at the same time. Thus the dot diameter data on the dot of the dot number N is supplied to the logic computing device 61 from both of the AND gates 37 to 40 and the AND gates 41 to 44.

If printing data on the next dot (dot number N+1) is "1" as well, though the printing data on the dot of the dot number N+1 is output from the latch 21, the output of the latch 18 is kept at "1". Accordingly the shift register 60 still holds the dot diameter data on the dot of the dot number N. Thus the logic computing device 61 receives the dot diameter data on the dot of the dot number N and the dot diameter data on the dot of the dot number N+1.

If printing data on a subsequent dot (dot number N+2) is "1" as well, though the printing data on the dot of the dot number N+2 is output from the latch 21, the output of the latch 18 is still kept at "1". Accordingly the shift register 60 still holds the dot diameter data on the dot of the dot number N. Thus the logic computing device 61 receives the dot diameter data on the dot of the dot number N and the dot diameter data on the dot of the dot number N+2.

As explained above, the shift register 60 takes in dot diameter data being output from the ROM 2 the moment at which printing data output from the latch 18 changes from "0" to "1", and holds it until printing data output from the latch 18 returns to "0". Thus, when printing a series of dots, dot diameter data on each of the series of dots is compared with dot diameter data first held in the latch 18, and is corrected in accordance with a result of the comparison. Accordingly, it is possible that all the dots within a dot block have diameters approximately equal to the diameter of the first dot situated at the edge of the dot block.

The operation of the logic computing device 61 will be explained in detail. As described above, the logic computing device 61 receives dot diameter data on the first dot situated at the edge of a dot block from the shift register 60. Let this dot diameter data be DATA1. The logic computing device 61 also receives dot diameter on a dot of interest at the same time. Let this dot diameter on the dot of interest be DATA 2. The logic computing device 61 performs the calculation: DATA=08H+(DATA1−DATA2).

That is, the logic computing device 61 determines the difference between the reference dot diameter data (DATA1) and the dot diameter data (DATA2) on the dot of interest to correct the diameter of the dot of interest in accordance with the difference. The result of the calculation is supplied to the control circuit 26 as gradation printing data on the dot of interest. By the above processing, when printing a dot block, all the dots within this dot block other than the first dot situated at the edge of the dot block have diameters approximately equal to the diameter of the first dot. That is, by the above processing, the effect of the lens-to-lens variation in the MTF values is suppressed and thereby dot-to-dot variation in the dot diameters can be suppressed. The line counter 25 counts the latch signals, and sends a reset signal to the control circuit 26 when the count value reaches the number of lines of one page, so that the above procedure is started from the first line of the next page.

Let the light intensity distributions of three consecutive light emitting elements be as shown by the curves a1, a2, a3 in FIG. 24(*a*), and the combined light intensity distribution be as shown by the curve b in FIG. 24(*a*). Let the value of dot diameter data held in the shift register 60 be 8, and the value of dot diameter data on the dot of interest (the middle dot in FIG. 24) be 10. In this case, the logic computing device 61 of the logic operation circuit 24B performs the calculation: 8−10=−2. Accordingly, the printing, gradation data on the dot of interest is calculated at 08H−02H=06H, so the amount of exposure energy at the time of printing the dot of interest is made smaller than the normal value, and its diameter becomes close to the diameter of the first dot situated at the edge of the dot block. Thus, the dot diameter of the dot of interest, which will be larger than those of dots adjacent thereto if the above correcting operation is not performed, can be about the same as those of the adjacent dots.

As in the first and the second embodiments, in the third embodiment, unlike conventional image forming apparatuses where diameters of printed dots vary greatly even though the intensities of the lights emitted by light emitting elements are made uniform, it is possible to make diameters of the printed dots close to the average value and to avoid causing a large change in the dot diameter between adjacent dots, thereby obtain a smooth printed image.

In addition, since the third embodiment is configured to hold dot diameter data on the first dot situated at the edge of a dot block to be printed in the shift register, compare dot diameter data on each dot within the dot block with this dot diameter data held in the shift register, and supplies results of the comparisons to the gradation LED head as printing gradation data on dots of interest in succession, it is possible to make all the dots within the dot block equal to the diameter of the first dot situated at the edge of the dot block, and thereby obtain a smooth printed image.

A Fourth Embodiment

In the above described third embodiment, printing data (video signal) to be corrected is binary data, whereas in a fourth embodiment of the invention, it is multivalued data so that gray scale images can be formed.

Figure 25:
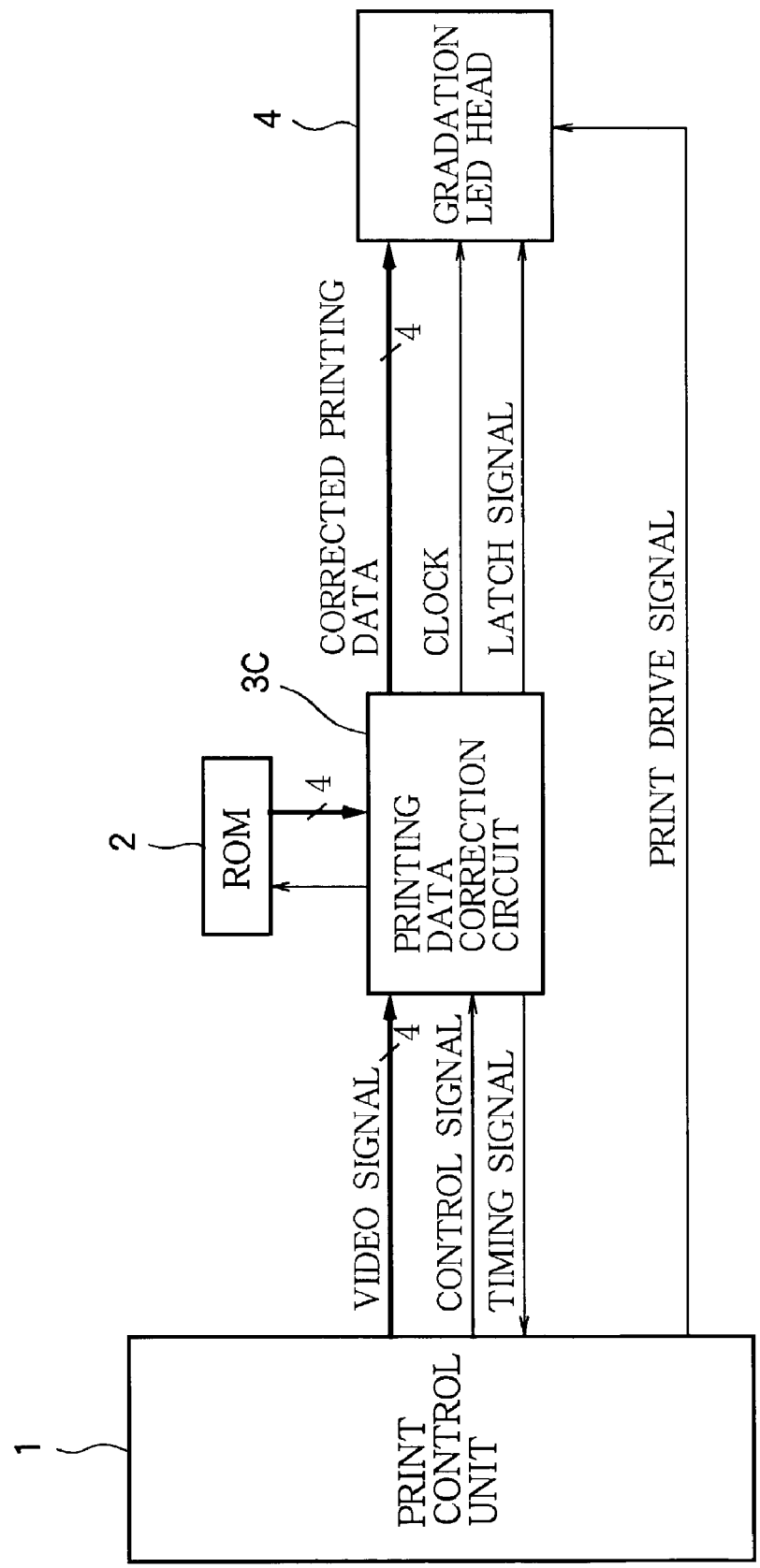
FIG. 25 shows a structure of a fourth embodiment of the image forming apparatus according to the invention.

FIG. 25 shows a structure of the fourth embodiment of the image forming apparatus according to the invention. As shown in this figure, the apparatus includes a print control unit 1, a printing data correction circuit 3C, a gradation LED head 4, and a non-volatile memory or a ROM 2 (for example, EEPROM). The print control unit 1 supplies the printing data correction circuit 3C with a video signal including printing data and a control signal for controlling the operation of the printing data correction circuit 3C. The printing data correction circuit 3C outputs a timing signal for synchronization with the print control unit 1 to the print control unit 1. The printing data correction circuit 3C supplies the gradation LED head 4 with corrected printing data output in synchronization with the timing signal, a latch signal for latching the corrected printing data in the LED head 4, and a clock. The ROM 2 connected to the printing data correction circuit 3C is to store dot diameter data obtained by measuring a diameter of a light spot formed on an image forming plane for each of the light emitting elements of the gradation LED head 4.

A structure of the printing data correction circuit 3C is explained below with reference to FIG. 26. The printing data correction circuit 3C has a structure similar to that of the printing data correction circuit 3B shown in FIG. 21. However, since the printing data transmitted between the buffer 11, the one-line receiving buffer 12, the latch 18 and the logic operation circuit 2C is not 1-bit data (binary data) but 4-bit data (multivalued data), they are connected with each other by four signal wires.

Figure 26:
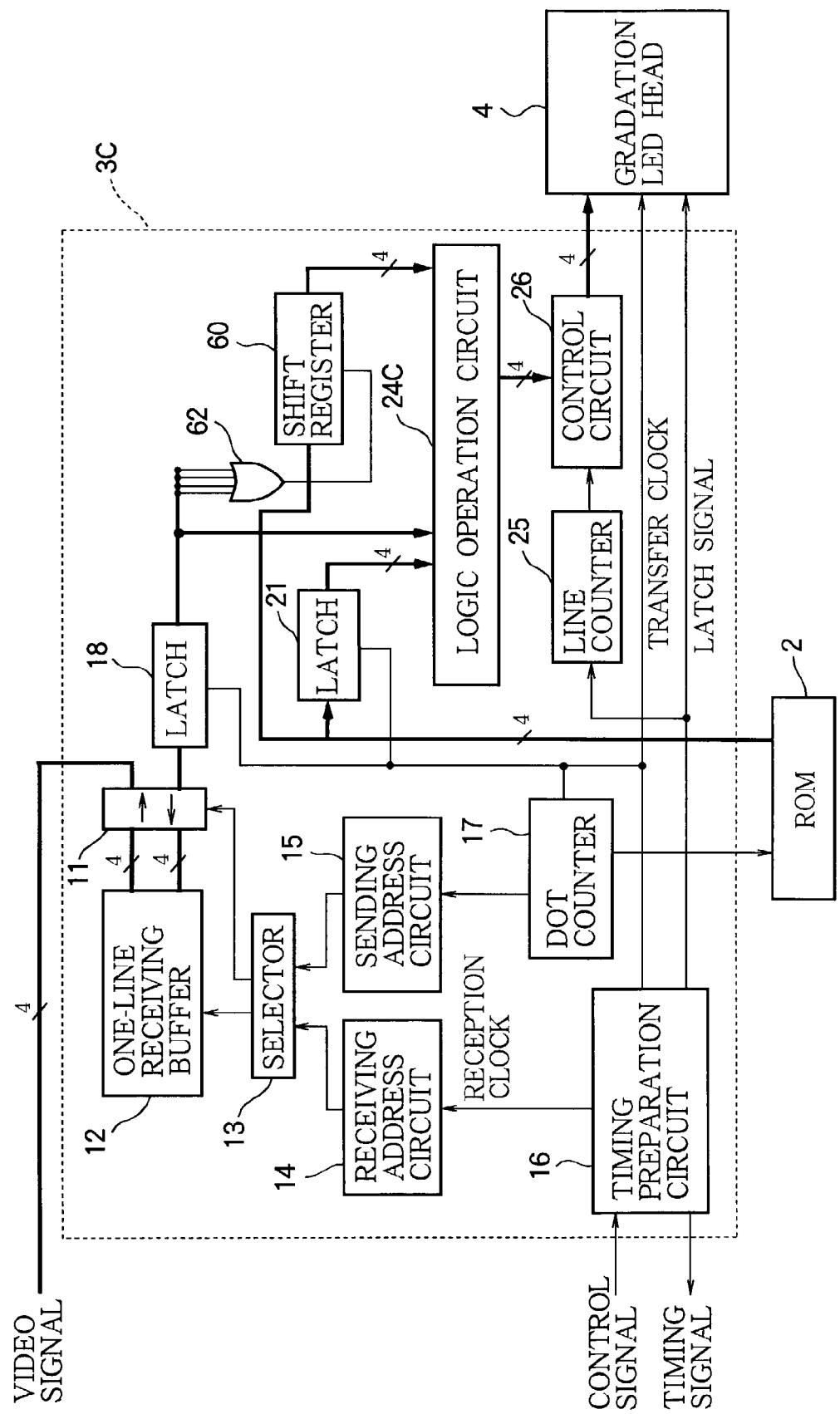
FIG. 26 is a block diagram showing a structure of a printing data correction circuit used in the fourth embodiment.

As shown in FIG. 26, the printing data correction circuit 3C includes a buffer 11, a one-line receiving buffer 12, a selector 13, a receiving address circuit 14, a sending address circuit 15, a timing preparation circuit 16, latches 18, 21, a shift register 60, a logic operation circuit 24C, a dot counter 17, a line counter 25, and a control circuit 26. The one-line receiving buffer 12 is connected to the input and the output of the buffer 11 that receives the video signal from the print control unit 1, and to the output of the selector 13. The two inputs of the selector 13 are connected to the output of the receiving address circuit 14 and the output of the sending address circuit 15 respectively. An output signal of the selector 13 is supplied to the buffer 11 as a buffer switching signal. The input of the receiving address circuit 14 is connected to the output of the timing preparation circuit 16, and the input of the sending address circuit 15 is connected to the output of the dot counter 17. The timing preparation circuit 16 supplies the timing signal to the print control unit 1, and the print control unit 1 supplies the control signal to the timing preparation circuit 16.

The timing preparation circuit 16 supplies a transfer clock to the gradation LED head 4, the latches 18, 21, and the dot counter 17. The timing preparation circuit 16 also supplies the latch signal to the gradation LED head 4. The output of the latch 18 is connected to the input of the logic operation circuit 24C and the input of the OR gate 62. The output of the OR gate 62 is connected to the clock input terminal of the shift register 60. The buffer 11 is connected to the input of the latch 18. The output of the latch 21 is connected to the input of the logic operation circuit 24C. The ROM 2 is connected to the input of the latch 21, the input of the shift register 60, and the output of the dot counter 17. The data line that extends from the ROM 2 to the logic operation circuit 24C via the latch 21 and the shift register 60 is comprised of four signal wires to enable transmission of 4-bit parallel dot diameter data. The control circuit 26 is connected to the output of the raster line counter 25, the output of the logic operation circuit 24C, and the input of the gradation LED head 4. The data line that extends from the logic operation circuit 24C to the gradation LED head 4 via the control circuit 26 is comprised of four signal wires to enable transmission of 4-bit parallel printing data. The line counter 25 is supplied with the latch signal to count the lines up to one page.

Figure 27:
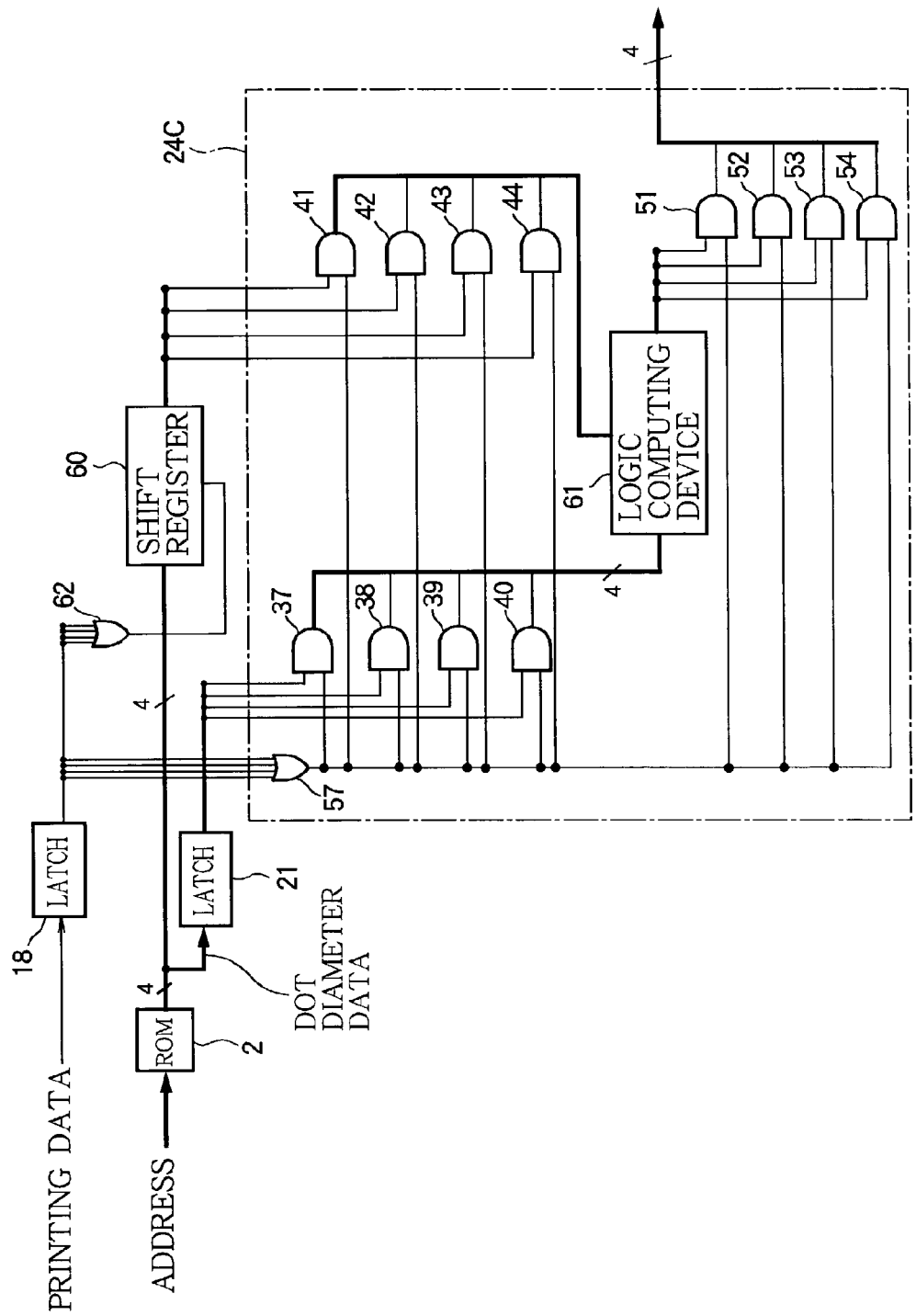
FIG. 27 is a circuit diagram showing a structure of a logic computing device within the printing data correction circuit shown in FIG. 26.

FIG. 27 shows a structure of the logic operation circuit 24C. As shown in FIG. 27, the logic operation circuit 24C includes AND gates 37 to 44, a logic computing device 61, AND gates 51 to 54, and OR gate 57.

The AND gates 37 to 40 are supplied with 4-bit printing data output from the latch 18 through the OR gate 57 and 4-bit dot diameter data output from the latch 21. The AND gates 41 to 44 are supplied with dot diameter data output from the shift register 60, and at the same time are supplied with the 4-bit printing data output from the latch 18 through the OR gate 57. The output of the AND gates 37 to 40 and the output of the AND gates 41 to 44 are supplied to the logic computing device 61. The AND gates 51 to 54 are supplied with the output of the logic computing device 61, and at the same time are supplied with the 4-bit printing data output from the latch 18 through the OR gate 57. The output of the AND gates 51 to 54 is supplied to the control circuit 26 as printing gradation data.

The operation of the fourth embodiment of the invention having the above-described structure will be explained below. In FIG. 25, the print control unit 1 sends the timing signal to the not illustrated higher controller when it stands ready to print, and then receives the video signal edited page by page from the higher controller. This video signal is sent from the print control unit 1 to the printing data correction circuit 3C together with the control signal. The printing data correction circuit 3C shown in FIG. 2 performs the following processing upon receiving this video signal. The timing preparation circuit 16 generates a reception clock in response to the control signal, and sends it to the receiving address circuit 14. The video signal received by the buffer 11 is stored at an address within the one-line receiving buffer 12 which the receiving address circuit 14 designates in synchronization with this reception clock. The operation of storing the video signal into the one-line receiving buffer 12 is performed each time one line of the video signal is received from the print control unit 1.

When the sending address circuit 15 designates a row address within the one-line receiving buffer 12, the data at this address is latched by the latch 18. The data output from the latch 18 is supplied to the logic operation circuit 24C. The dot counter 17 increments its count value that indicates which dot the printing data just latched corresponds to until all the data within the one-line receiving buffer 12 are latched. The dot counter 17 also supplies the ROM 2 with the address the dot diameter data at which corresponds to the printing data being supplied to the logic operation circuit 24C. Thus, as soon as printing data is input into the logic operation circuit 24C, corresponding dot diameter data is input into the logic operation circuit 24C from the ROM 2 through the latch 21. The logic operation circuit 24C calculates, from 4-bit printing data output from the latch 18 and 4-bit dot diameter data output from the latch 21 and the shift register 60 respectively, corrected printing data comprising four bits on the dot assigned to this 1-bit printing data.

Here, explanation of the dot diameter data stored in the ROM2 is given. As explained with reference to FIG. 6, the procedure that includes measuring a diameter of a dot (a spot light) formed on an image forming plane for each of the light emitting elements of the LED head 4, and averaging the measured dot diameters is carried out in the fourth embodiment as well. As has been explained with reference to FIG. 4, a dot density or a dot diameter can be varied on a dot-to-dot basis by varying gradation data supplied to the LED head 4, and the value of the gradation data and the dot diameter are in a direct proportional relationship. So, to make a dot printed when gradation data having a value of 08H (a median value) is supplied to the gradation LED head 4 have a diameter equal to the average value of the measured dot diameters, necessary settings are made. Let the average value of the measured dot diameters be S8.

Figure 28:
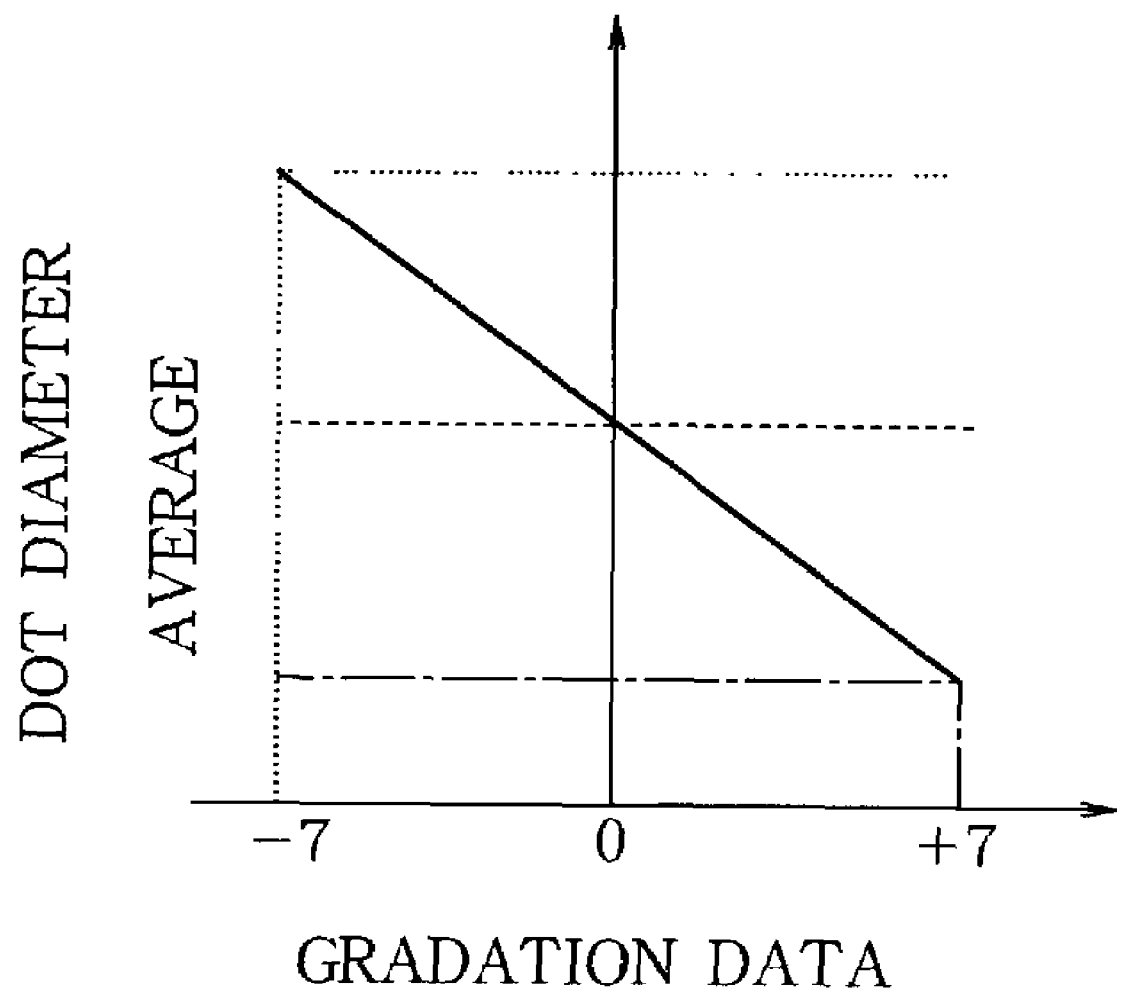
FIG. 28 is a graph showing a relationship between gradation data and dot diameter in the fourth embodiment.
Figure 30:
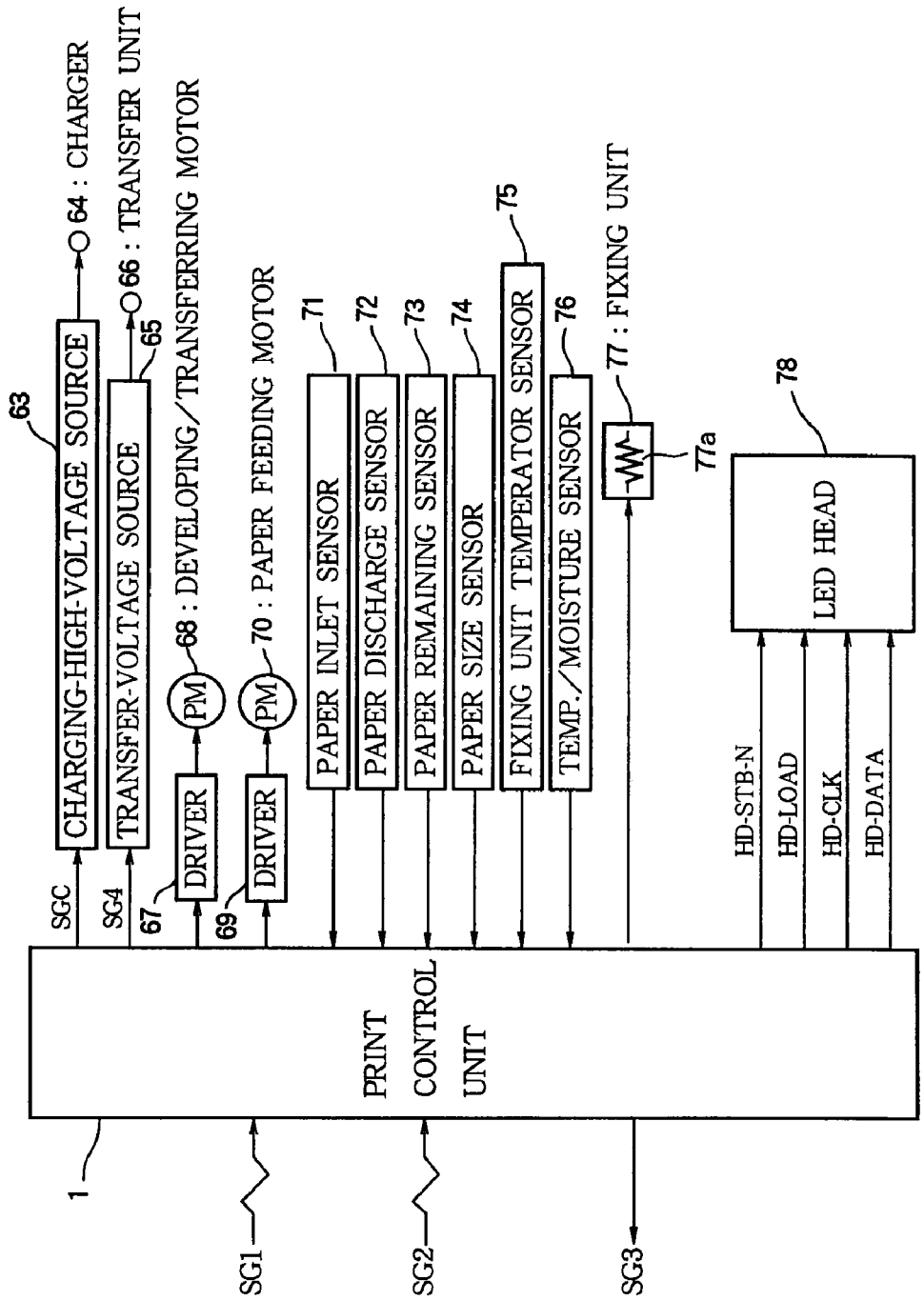
FIG. 30 shows a structure of a typical electrophotographic printer.
Figure 31:
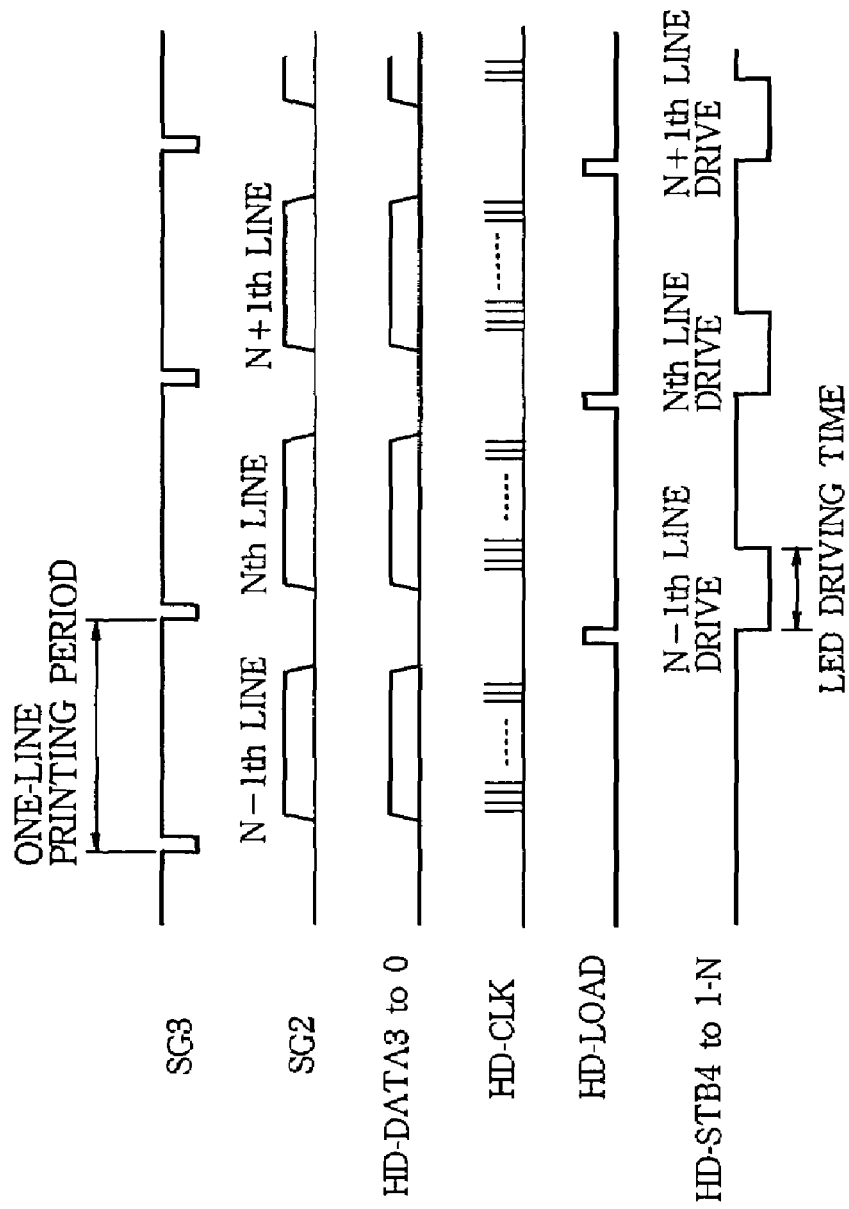
FIG. 31 is a timing diagram for explaining the operation of the electrophotographic printer shown in FIG. 30.
Figure 32:
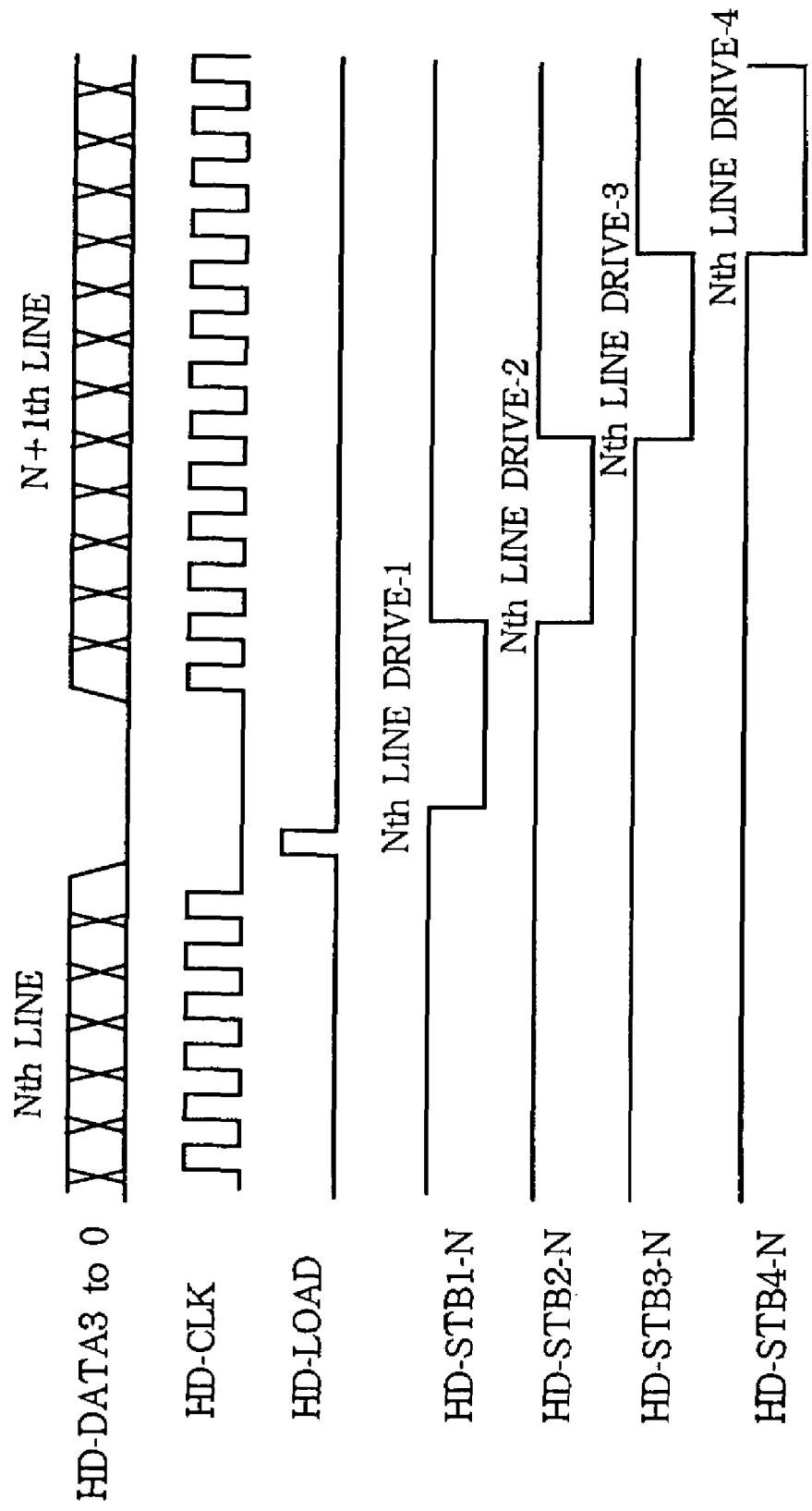
FIG. 32 is a timing diagram for explaining the operation of the electrophotographic printer shown in FIG. 30.
Figure 33:
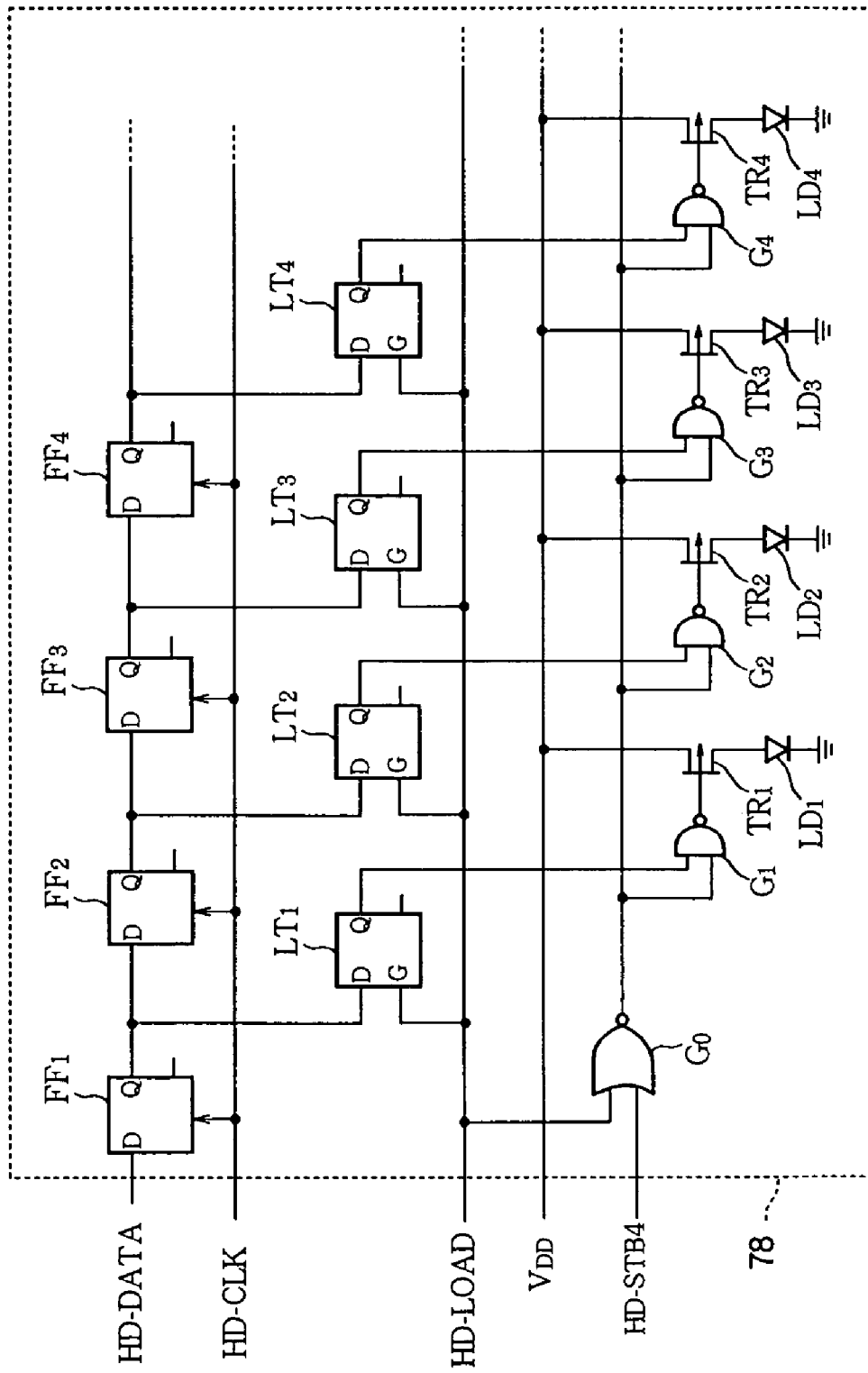
FIG. 33 shows a circuit diagram of an LED head for use in a typical electrophotographic printer.
Figure 34:
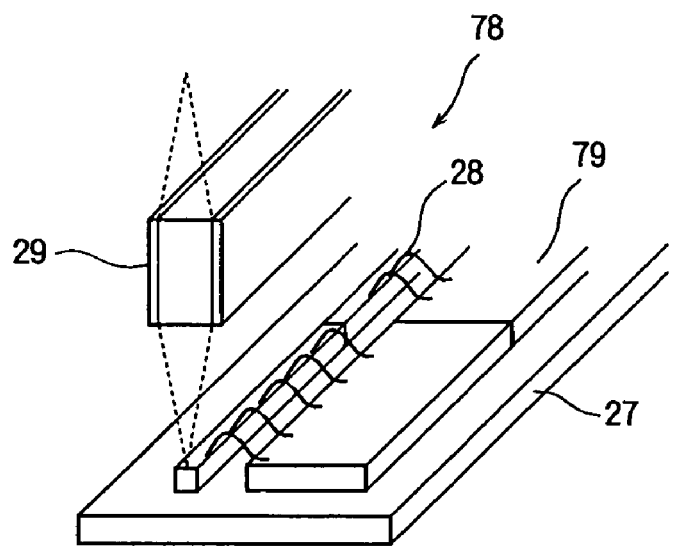
FIG. 34 shows a structure of an LED head and a structure of a lens array for use in a typical electrophotographic printer.
Figure 35:
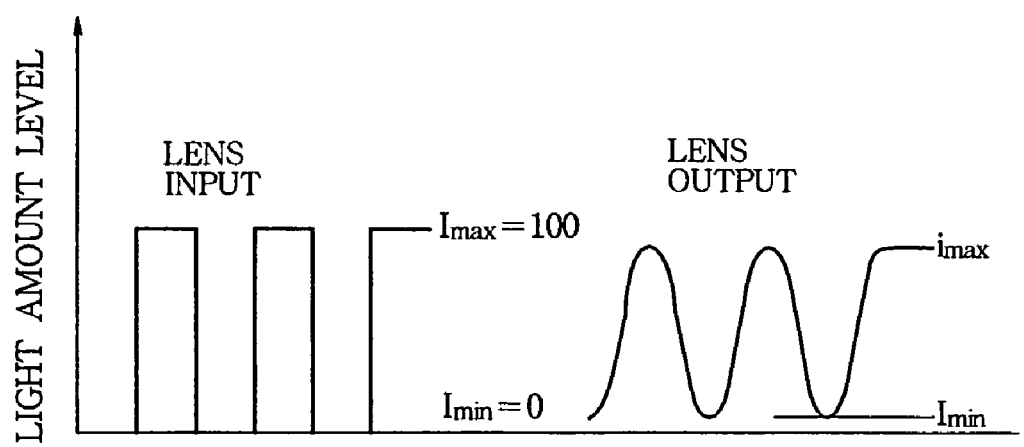
FIG. 35 is an explanatory view of the MTF of a lens array.
Figure 36:
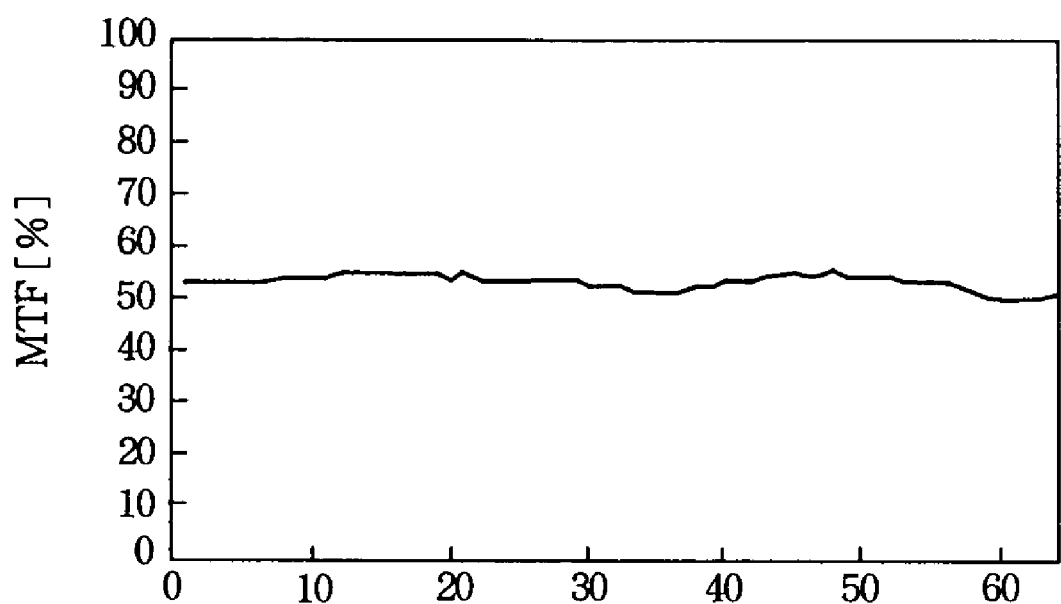
FIG. 36 is a graph showing an example of measured MTF values.

When the value of gradation data is varied by a single step of 01H to change from 08H to 09H, if a resultant variation in the dot diameter is $\Delta S$ even when gradation data has a value of any of 01H to FH other than 08H, a resultant variation in the dot diameter is about $\Delta S$ as long as the value of gradation data is varied by a single step of 01H. So, a light emitting element that forms a dot having a diameter larger than the average value by $\Delta S$ is assigned to −1 as dot diameter data. Likewise, a light emitting element that forms a dot having a diameter smaller than the average value by $2\Delta S$ is assigned to +2 as dot diameter data. By such assignments of dot diameter data, gradation data and dot diameter data are in such a relationship as shown in FIG. 28. Each of measured dot diameters is converted into 4-bit gradation data by use of this relationship and stored in the ROM 2 as dot diameter data.

The operation of the logic computing circuit 61 will be explained in detail. As explained above, as soon as printing data is input into the latch 18, dot diameter data on a light emitting element to be supplied with this printing data is input into the shift register 60 from the ROM 2. The shift register 60 holds dot diameter data on a first dot of a series of dots all assigned to the printing data of "1" representing "to be printed". The logic computing device 61 receives dot diameter data DATA1 held within the shift register 60 and dot diameter data DATA2 on a dot of interest.

The logic computing device 61 performs the calculation: DATA=DATAQ+(DATA1+DATA2) where DATAQ represents printing gradation data on the dot of interest before correction. That is, the logic computing device 61 determines the sum of the reference dot diameter data DATA1 and the dot diameter data DATA2 on the dot of interest, adds the sum to the printing gradation data DATAQ on the dot of interest before correction, and supplies a result of the addition to the control circuit 26 as corrected printing gradation data DATA on the dot of interest.

Here, assume that printing data on a dot having a dot number N−1 is newly input, and this new printing data is "0". The output of the latch 18 is "0" at this moment, so the output of the AND gates 51 to 54 is "0", and therefore this dot is not printed. Then, if printing data of "0" on a dot having a dot number N is input, the output of the latch 18 becomes "1" and dot diameter data on the dot having the dot number N is output from the latch 21. Since the latch 18 outputs "1" to the clock input terminal of the shift register 60 at this time, the dot diameter data on the dot having the dot number N is supplied to the logic computing device 61 from the shift register 60 via the AND gates 41 to 44. Furthermore, the output of the AND gates 37 to 40 is supplied to the logic computing device 61 at the same time. Thus the dot diameter data on the dot of the dot number N is supplied to the logic computing device 61 from both of the AND gates 37 to 40 and the AND gates 41 to 44.

If printing data on the next dot (dot number N+1) is "1" as well, though the printing data on the dot of the dot number N+1 is output from the latch 21, the output of the latch 18 is kept at "1". Accordingly the shift register 60 still holds the dot diameter data on the dot of the dot number N. Thus the logic computing device 61 receives the dot diameter data on the dot of the dot number N and the dot diameter data on the dot of the dot number N+1.

If printing data on a subsequent dot (dot number N+2) is "1" as well, though the printing data on the dot of the dot number N+2 is output from the latch 21, the output of the latch 18 is still kept at "1". Accordingly the shift register 60 still holds the dot diameter data on the dot of the dot number N. Thus the logic computing device 61 receives the dot diameter data on the dot of the dot number N and the dot diameter data on the dot of the dot number N+2.

As explained above, the shift register 60 takes in the dot diameter data being output from the ROM 2 when the printing data output from the latch 18 has changed from "0" to "1", and holds it until the printing data output from the latch 18 returns to "0". Thus, when printing a series of dots, dot diameter data on each of the series of dots is compared with dot diameter data first held in the latch 18, and is corrected in accordance with a result of the comparison. Accordingly, it is possible that all the dots within a dot block have diameters approximately equal to the diameter of the first dot situated at the edge of the dot block. The line counter 25 counts the latch signals, and sends a reset signal to the control circuit 26 when the count value reaches the number of lines of one page, so that the above procedure is started from the first line of the next page.

Let the light intensity distributions of three consecutive light emitting elements be as shown by the curves a1, a2, a3 in FIG. 29(*a*), and the combined light intensity distribution be as shown by the curve b in FIG. 29(*a*). As shown in FIG. 29(*a*), the combined light intensity distribution has a distorted profile since the MTF value of the middle light emitting element is large.

Let the value of printing gradation data on a dot of interest be 08H, the value of dot diameter data held in the shift register 60 be 0, and dot diameter data on the dot of interest (the middle dot in FIG. 29) be −2. In this case, the logic computing device 61 of the logic operation circuit 24C performs the calculation: 0+(−2)=−2. Accordingly, the printing gradation data on the dot of interest is calculated at 08H−02H=06H, so the amount of exposure energy at the time of printing the dot of interest is made smaller than the normal value, and its diameter becomes close to the diameter of the first dot situated at the edge of the dot block. Thus, the dot diameter of the dot of interest, which will be larger than those of dots adjacent thereto if the above correcting operation is not performed, can be about the same as those of the adjacent dots as shown in FIG. 29(*b*).

As in the first, second and third embodiments, in the fourth embodiment, unlike conventional image forming apparatuses where diameters of printed dots vary greatly even though the intensities of the lights emitted by light emitting elements are made uniform, it is possible to make diameters of the printed dots close to the average value and to avoid causing a large change in the dot diameter between adjacent dots, thereby obtain a smooth printed image.

In addition, since the fourth embodiment is configured to hold dot diameter data on the first dot situated at the edge of a dot block to be printed in the shift register, compare dot diameter data on each dot within the dot block with this dot diameter data held in the shift register, and supplies results of the comparisons to the gradation LED head as printing gradation data on dots of interest in succession, it is possible to make all the dots within the dot block equal to the diameter of the first dot situated at the edge of the dot block, and thereby obtain a smooth printed image.

For presenting images in halftone, when the amount of exposure energy is reduced to a half of its maximum so that printed dots have half the diameter of the dots printed by applying the maximum exposure energy, as is the case in representing a wide background of a photograph by small dots, if the MTF values of the lenses of a lens array used vary, there occurs unevenness in density, and thereby printing quality is degraded. With the fourth embodiment, since small dots representing a wide gray area can be uniform in the diameters, it is possible to make the gray area uniform in density. As described above, with the fourth embodiment of the invention, even when the dots have small diameters to represent gray scale, it is possible to suppress unevenness in density and thereby to maintain printing quality fine.

References have been made to various cases where the present invention is applied to an electrophotographic printer having an LED head, however, the present invention is not limited thereto but applicable to any image forming apparatus having an array of elements driven selectively such as a thermal printer having an array of heating resistors and a display apparatus having an array of display elements.

The above explained preferred embodiments are exemplary of the invention of the present application which is described solely by the claims appended below. It should be understood that modifications of the preferred embodiments may be made as would occur to one of skill in the art.

What is claimed is:

1. An image forming apparatus including elements driven by driving data, comprising:

a memory that stores a plurality of items of driving data for driving the elements such that each of the elements is driven by a corresponding one of the plurality of items of driving data; and a computing unit that reads, from said memory, a first one of the plurality of items of driving data for a first element corresponding to a first dot in a predetermined print area and at least a second one of the plurality of items of driving data for a second element corresponding to a second dot in the predetermined print area, said computing unit producing corrected printing data for the first dot based on printing data for the first dot, the first one of the plurality of items of driving data, and the at least a second one of the plurality of items of driving data, wherein said computing unit calculates a sum of values of driving data for elements corresponding to dots in the predetermined print area, and then calculates an average of the values by dividing the sum by the number of the dots in the predetermined print area, wherein said computing unit subtracts a value of the driving data for the first element corresponding to the first dot from the average to make a first value, and then adds a value of normal driving data to the first value to make a second value as a value of the corrected printing data, and wherein the image forming apparatus performs printing by driving the first element in accordance with the corrected punting data.

2. An image forming apparatus according to claim 1, in which said printing data are binary data.

3. An image forming apparatus according to claim 1, in which said printing data are multivalued data.

4. An image forming apparatus according to claim 1, in which the elements driven by the driving data are gradation LEDs.

5. An image forming apparatus according to claim 1, in which said elements are light-emitting elements and the light-condensing members are provided for condensing light emitted by said elements, the driving data stored in said memory being data based on intensities of the light condensed by said light-condensing members.

* * * * *